(12) United States Patent
Shin et al.

(10) Patent No.: US 12,132,202 B2
(45) Date of Patent: Oct. 29, 2024

(54) CATHODE ACTIVE MATERIAL FOR LITHIUM SECONDARY BATTERY, PREPARATION METHOD THEREOF, CATHODE INCLUDING CATHODE ACTIVE MATERIAL, AND LITHIUM SECONDARY BATTERY INCLUDING CATHODE

(71) Applicant: Samsung SDI Co., Ltd., Yongin-si (KR)

(72) Inventors: Dongwook Shin, Yongin-si (KR); Jinhwan Park, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 637 days.

(21) Appl. No.: 17/081,125

(22) Filed: Oct. 27, 2020

(65) Prior Publication Data

US 2021/0126256 A1 Apr. 29, 2021

(30) Foreign Application Priority Data

Oct. 29, 2019 (KR) .......................... 10-2019-0135760

(51) Int. Cl.
*H01M 4/52* (2010.01)
*C01G 53/00* (2006.01)
(Continued)

(52) U.S. Cl.
CPC ............ *H01M 4/525* (2013.01); *C01G 53/50* (2013.01); *H01M 4/366* (2013.01); *H01M 4/483* (2013.01);
(Continued)

(58) Field of Classification Search
None
See application file for complete search history.

(56) References Cited

U.S. PATENT DOCUMENTS 8,021,785 B2 * 9/2011 Wakasugi ............. H01M 4/485
429/223
9,799,879 B2 10/2017 Yang
(Continued)

FOREIGN PATENT DOCUMENTS

JP 2014-116296 6/2014
JP 2016-081903 A 5/2016
(Continued)

OTHER PUBLICATIONS

Yonghyun Cho et al., A new type of protective surface layer for high-capacity Ni-based cathode materials: nanoscaled surface pillaring layer, Nano Letters, 2013, vol. 13, pp. 1145-1152. (Year: 2013).*

(Continued)

*Primary Examiner* — Maria Laios
*Assistant Examiner* — Angela J Martin
(74) *Attorney, Agent, or Firm* — Knobbe, Martens, Olson & Bear, LLP

(57) ABSTRACT

This application relates to a cathode active material for a lithium secondary battery, a method of preparing the cathode active material, a cathode employing the cathode active material, and a lithium secondary battery employing the cathode. The cathode active material may include a secondary particle in which primary particles are aggregated and a first coating layer disposed on the plurality of primary particles to have a thickness of about 2.5 nm or less and including a NiO-like crystalline phase belonging to a Fm3-m space group. The cathode active material may prevent surface deterioration through a washing process using a weakly acidic or neutral organic buffer, thereby improving the initial efficiency characteristic and life characteristics of the lithium secondary battery while maintaining the initial capacity of the lithium secondary battery.

20 Claims, 20 Drawing Sheets

(51) Int. Cl.
- *H01M 4/36* (2006.01)
- *H01M 4/48* (2010.01)
- *H01M 4/525* (2010.01)
- *H01M 10/05* (2010.01)
- *H01M 10/0525* (2010.01)
- *H01M 4/02* (2006.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 10,581,074 B2 | 3/2020 | Son et al. | |
| 2009/0087362 A1 | 4/2009 | Sun et al. | |
| 2009/0104517 A1* | 4/2009 | Yuasa | H01M 4/505 429/223 |
| 2009/0309063 A1* | 12/2009 | Paulsen | H01M 4/525 252/182.33 |
| 2013/0266843 A1* | 10/2013 | Hara | H01M 4/131 429/231.8 |
| 2015/0104708 A1 | 4/2015 | Bi | |
| 2016/0118648 A1 | 4/2016 | Gunji | |
| 2018/0215629 A1* | 8/2018 | Honma | H01M 4/505 |
| 2018/0316005 A1* | 11/2018 | Shin | H01M 4/0471 |
| 2019/0006670 A1* | 1/2019 | Gunji | H01M 4/04 |
| 2019/0123350 A1 | 4/2019 | Choi | |

FOREIGN PATENT DOCUMENTS

| | | |
|---|---|---|
| KR | 10-0595361 B1 | 1/2006 |
| KR | 10-0796953 B1 | 7/2006 |
| KR | 10-2006-0109305 A | 10/2006 |
| KR | 10-2009-0115140 A | 11/2009 |
| KR | 10-1523082 B1 | 1/2015 |
| KR | 10-1627847 B1 | 4/2016 |
| KR | 10-2017-0112850 | 10/2017 |
| KR | 10-1892612 B1 | 10/2017 |
| KR | 10-2018-0012527 | 2/2018 |

OTHER PUBLICATIONS

Cho et al., A new type of protective surface layer for high-capacity Ni-based cathode materials: nanoscaled surface pillaring layer, Nano Letters, vol. 13, pp. 1145-1152, 2013.

Office Action dated Mar. 10, 2021 in corresponding Korean Patent Application No. 10-2019-0135760.

Notice of Allowance dated Oct. 18, 2021 in corresponding Korean patent application No. 10-2019-0135760, 2 pp.

* cited by examiner

CATHODE ACTIVE MATERIAL FOR LITHIUM SECONDARY BATTERY, PREPARATION METHOD THEREOF, CATHODE INCLUDING CATHODE ACTIVE MATERIAL, AND LITHIUM SECONDARY BATTERY INCLUDING CATHODE

CROSS-REFERENCE TO RELATED APPLICATION

This application claims the benefit of Korean Patent Application No. 10-2019-0135760, filed on Oct. 29, 2019, in the Korean Intellectual Property Office, the disclosure of which is incorporated herein in its entirety by reference.

BACKGROUND

1. Field

One or more embodiments disclosed herein relate to a cathode active material, a method of preparing the cathode active material, a cathode employing the cathode active material, and a lithium secondary battery employing the cathode.

2. Description of the Related Art

In order to meet the miniaturization and high performance of various devices, high energy density of lithium secondary batteries have become important in addition to the miniaturization and weight reduction of lithium secondary batteries. Thus, the need for high-capacity lithium secondary batteries has become important.

SUMMARY

One or more embodiments provide a cathode active material capable of improving the initial efficiency, capacity and life characteristics of a lithium secondary battery.

One or more embodiments provide a method of preparing the cathode active material.

One or more embodiments provide a cathode employing the cathode active material.

One or more embodiments provide a lithium secondary battery employing the cathode.

Additional aspects will be set forth in part in the description that follows and, in part, will be apparent from the description, or may be learned by practice of the presented embodiments of the disclosure.

According to one or more embodiments, a cathode active material for a lithium secondary battery comprises a secondary particle comprising a plurality of primary particles, and a first coating layer disposed on the plurality of primary particles to have a thickness of about 2.5 nm or less and comprising a NiO-like crystalline phase belonging to a Fm3-m space group.

According to one or more embodiments, a method of preparing the cathode active material comprises primarily heat-treating a mixture comprising a transition metal precursor and a lithium source, washing a resulting product of the primary heat treatment using a solvent comprising a weakly acidic or neutral organic buffer, and secondarily heat-treating the washed resulting product.

According to one or more embodiments, a cathode comprises the cathode active material.

According to one or more embodiments, a lithium secondary battery comprises the cathode.

According to one or more alternative embodiments, a cathode active material for a lithium secondary battery comprises a secondary particle comprising a plurality of primary particles, and a first coating layer disposed on the primary particles to have a thickness of about 2.5 nm or less, the first coating layer comprising a NiO-like crystalline phase belonging to a Fm3-m space group.

In some embodiments of the cathode active material, the primary particles comprise a nickel-based lithium transition metal oxide in which a content of nickel in a transition metal is about 70 mol % or more. The primary particles comprise a lithium transition metal oxide represented by Formula 1, wherein Formula 1 is $Li_aNi_bM1_cM2_dO_2$, wherein, M1 is at least one element selected from Co, Mn, and Al, M2 is at least one element selected from B, Mg, Ti, Ca, Na, K, Sr, Cr, V, Fe, Cu, Zr, Zn, Si, Y, Nb, Ga, Sn, Mo, W, Ba, and rare-earth elements, and $0.9 \le a \le 1.1$, $0.7 \le b < 1.0$, $0 < c \le 0.3$, $0 \le d \le 0.1$, and $0.95 \le b+c+d \le 1.05$ are satisfied.

In some embodiments, of the cathode active material, the primary particles comprise a lithium transition metal oxide represented by Formula 2 wherein Formula 2 is $Li_aNi_bCo_cM1'_{c'}M2_dO_2$, wherein, M1' is at least one element selected from Mn and Al, M2 is at least one element selected from B, Mg, Ti, Ca, Na, K, Sr, Cr, V, Fe, Cu, Zr, Zn, Si, Y, Nb, Ga, Sn, Mo, W, Ba, and rare-earth elements, and $0.9 \le a \le 1.1$, $0.7 \le b < 1.0$, $0 < c' \le 0.3$, $0 < c'' \le 0.3$, $0 < c'+c'' \le 0.3$, $0 \le d' \le 0.1$, and $b+c'+c''+d'=1$ are satisfied.

In some embodiments of the cathode active material, the nickel-based lithium transition metal oxide comprises a layered crystalline phase belonging to a R-3m space group.

In some embodiments of the cathode active material, the primary particles have an average particle diameter of about 50 nm to about 2 μm, and wherein a combination of the primary particles and the at least one additional particle have an average particle diameter of about 1 μm to 50 μm.

In some embodiments of the cathode active material, the secondary particle further comprises a second coating layer on a portion of a surface of the secondary particle, the second coating layer containing a metal compound of cobalt (Co) and at least one selected from Group 2 elements, Group 12 elements, and Group 13 elements.

In some embodiments of the cathode active material, the metal compound comprises a metal alloy, a metal oxide, a metal sulfide, a metal chloride, a metal nitride, a metal fluoride, a metal phosphide, a metal alkoxide, or a combination thereof. The content of the metal oxide is about 0 parts by weight to about 5 parts by weight based on 100 parts by weight of the lithium metal oxide comprised in the second particle. The second coating layer is uniformly formed on the surface of the secondary particle to have a thickness of about 1 μm or less.

In some embodiments, a cathode comprises any of the embodiments of the cathode active material disclosed herein.

In some embodiments, a lithium secondary battery comprises any of the embodiments of the cathode herein.

In some embodiments, a method of preparing a cathode active material comprises primarily heat-treating a mixture comprising a transition metal precursor and a lithium source, washing the primarily heat-treated mixture using a solvent comprising a weakly acidic or neutral organic buffer to obtain a washed mixture, and secondarily heat-treating the washed mixture.

In some embodiments of the method, the organic buffer comprises an amphiphilic organic compound having a sulfone group. The amphiphilic organic compound having a sulfone group comprises at least one selected from the group consisting of MOPS (3-(N-morpholino)propanesulfonic acid), MES (2-(N-morpholino)ethanesulfonic acid), HEPES (2-[4-(2-hydroxyethyl)piperazin-1-yl] ethanesulphonic acid), PIPES (1,4-piperazindieethanesulfonic acid), TES (N-tris(hydroxymethyl)methyl-2-aminoethanesulfonic acid), ACES (2-(carbamoylmethylamino)ethanesulfonic acid), BES (N,N-bis(2-hydroxyl-2-amino)ethanesulfonic acid), and CHES ((cyclohexylamino)ethanesulfonic acid). The organic buffer is included in the solvent in a concentration of about 0.001 M to about 2 M. The organic buffer is added to the solvent one or more times during the washing. The washing of the resulting product, a coating material for surface-coating the cathode active material is further introduced into the solvent. The mixture is prepared by a dry mixing method.

The at least one of the primary heat treatment and the secondary heat treatment is performed at about 600° C. to about 1000° C. under an air or oxygen atmosphere.

BRIEF DESCRIPTION OF THE DRAWINGS

The aspects, features, and advantages of certain embodiments of the present disclosure will be more apparent from the following description taken in conjunction with the accompanying drawings.

DETAILED DESCRIPTION

Figure 1:
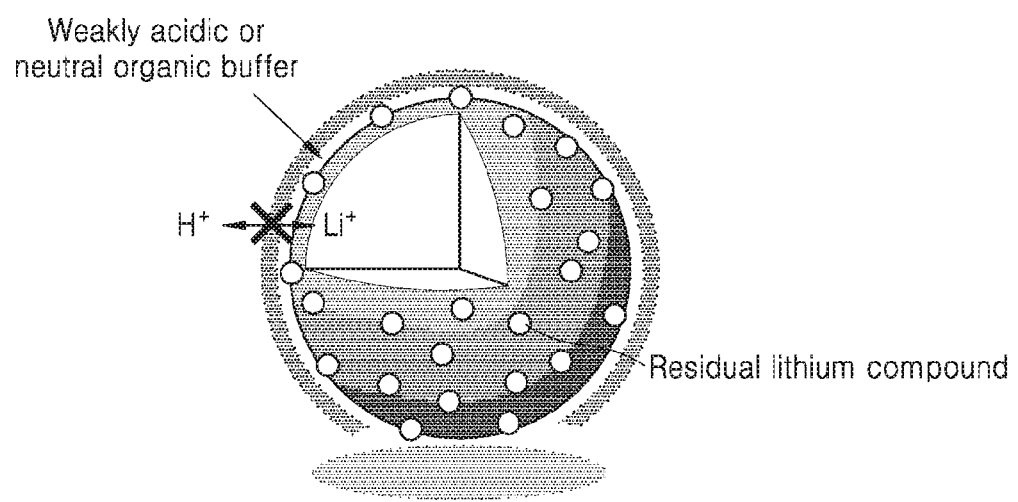
FIG. 1 is a schematic view for explaining an action mechanism of a weakly acidic or neutral organic buffer in a method of paring a cathode active material for a lithium secondary battery according to an embodiment.

In order to obtain high-capacity lithium secondary batteries, cathode active materials having high capacity have been examined. Although a single-component lithium cobalt oxide ($LiCoO_2$) was mainly used as a cathode active material of a lithium secondary battery, recently, the use of a high-capacity lithium composite metal oxide having a layered structure has been increased. In order to increase the capacity of the battery, research has been conducted in the direction of increasing the content of nickel contained in the lithium composite metal oxide.

However, the lithium composite metal oxide having a high nickel content exhibits the oxidation and depletion of an electrolyte caused by side reactions between an N-rich composition and residual lithium compound components ($Li_2CO_3$ and LiOH) and the electrolyte, the elution of cathode active material components, and the deterioration of charging-discharging performance due to the elution thereof.

As a conventional method for solving this problem, there is a method of removing residual lithium components by a washing method using water after the synthesis of a cathode active material, or a method of forming a Co-rich or Mn-rich crystalline phase on the surface by precipitation coating simultaneously with washing. Alternatively, there is a method of reducing residual lithium components by forming a Li-containing compound by coating the surface with a composition of Co or Mn oxide or phosphorus oxide in a state of excluding or minimizing a washing process to react with residual lithium on the surface.

However, the washing method using water and the precipitation coating method comprising washing are excellent in removing residual lithium, but they cause damage to the surface of the cathode active material to deteriorate the battery performance. Further, protonation occurs as the concentration of protons in the surface of the secondary particle of the cathode active material or in the inner pores of the secondary active material is increased by an acidic coating material such as acetate, nitrate, sulfate, or chloride added during water washing or coating. That is, ion exchange of Li ions (Li$^+$) and protons (H$^+$) on the surface of the cathode active material occurs. Meanwhile, in the coating method excluding or minimizing the washing process, it is difficult to sufficiently remove residual lithium.

In particular, since the reduction of residual lithium is necessarily required to ensure the cycle life, calendar life and safety of the battery using a high content Ni-based oxide, regardless of the surface damage caused by washing, a washing process using water is currently used in the art.

Therefore, there is a need to develop a cathode active material capable of effectively removing residual lithium on the surface of the cathode active material and improving the performance of a lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which example embodiments are illustrated. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. Throughout the written description and drawings, when an element such as a layer, a film, a region or a component is referred to as being "on" another layer or element, it can be "directly on" the other layer or element, or intervening layers, regions, or components may also be present.

Although the terms "first", "second", "third", etc., may be used herein to describe various elements, components, regions, and/or layers, these elements, components, regions, and/or layers should not be limited by these terms. These terms are used only to distinguish one component from another, not for purposes of limitation.

Hereinafter, non-limiting embodiments of a cathode active material, a method of preparing the cathode active material, a cathode employing the cathode active material, and a lithium secondary battery employing the cathode will be described in detail.

In some embodiments, a cathode active material for a lithium secondary battery according to an embodiment includes: a secondary particle including a plurality of primary particle; and a first coating layer disposed on the plurality of primary particles to have a thickness of about 2.5 nm or less and including a NiO-like crystalline phase belonging to a Fm3-m space group.

In some embodiments, the primary particles aggregate together to form a secondary particle, and may have various shapes from a rod to a square. The primary particles may be, for example, crystallites having the same crystal structure in the secondary particle.

The term "secondary particles" refer to particles each including a plurality of primary particles, and refer to particles that are not aggregates of other particles, or particles that are no longer aggregated. The secondary particle may have a spherical shape.

In some embodiments, the primary particle may include a nickel-based lithium transition metal oxide in which a content of nickel in a transition metal is 70 mol %. The content of nickel in the transition metal included in the lithium transition metal oxide may be about 70 mol % or more, about 71 mol % or more, about 75 mol % or more, about 80 mol % or more, about 85 mol % or more, about 90 mol % or more, about 93 mol % or more, about 95 mol % or more, or about 97 mol % or more. When the content of nickel in the lithium transition metal oxide may be about 70 mol % or more, it is possible to express a high capacity. Therefore, a lithium secondary battery providing a high capacity may be implemented.

In some embodiments, the primary particles include a lithium transition metal oxide represented by Formula 1 below.

$$Li_aNi_bM1_cM2_dO_2 \quad \text{[Formula 1]}$$

wherein in Formula 1, M1 is at least one element selected from Co, Mn, and Al, M2 is at least one element selected from B, Mg, Ti, Ca, Na, K, Sr, Cr, V, Fe, Cu, Zr, Zn, Si, Y, Nb, Ga, Sn, Mo, W, Ba, and rare-earth elements, and 0.9≤a≤1.1, 0.7≤b<1.0, 0<c≤0.3, 0≤d≤0.1, and 0.95≤b+c+d≤1.05 are satisfied.

For example, the lithium transition metal oxide may be represented by Formula 2 below.

$$Li_aNi_bCo_cM1'_{c''}M2_dO_2 \quad \text{[Formula 2]}$$

wherein in Formula 2, M1' is at least one element selected from Mn and Al, M2 is at least one element selected from B, Mg, Ti, Ca, Na, K, Sr, Cr, V, Fe, Cu, Zr, Zn, Si, Y, Nb, Ga, Sn, Mo, W, Ba, and rare-earth elements, and 0.9≤a≤1.1, 0.7≤b<1.0, 0<c'≤0.3, 0<c''≤0.3, 0<c'+c''≤0.3, 0≤d'≤0.1, and b+c'+c''+d'=1 are satisfied.

For example, the lithium transition metal oxide may be represented by Formula 3 below.

$$Li_aNi_bCo_{c'}Mn_{c''}O_2 \quad \text{[Formula 3]}$$

wherein in Formula 3, 0.9≤a≤1.1, 0.7≤b<1.0, 0<c'≤0.3, 0<c''≤0.3, 0<c'+c''≤0.3, and b+c'+c''=1 are satisfied.

In Formulae 1 to 3 above, the content of nickel is about 70 mol % or more based on the total content of metals including transition metals except for lithium according to some embodiments herein. Similarly, when the lithium transition metal oxide includes the high content of nickel, it is possible to obtain a high capacity. Therefore, a high-capacity lithium secondary battery may be obtained.

The lithium transition metal oxide may include a layered crystalline phase belonging to a rock salt layered structure (R-3m space group) according to some embodiments herein. The cathode active material having the layered crystalline structure may further improve the cycle characteristics and thermal stability of a lithium secondary battery.

The cathode active material includes a first coating layer formed on the primary particle to have a thickness of about 2.5 nm or less and including a NiO-like crystalline phase (hereinafter referred to as "NiO-like phase" or "NiO phase") belonging to a Fm3-m space group according to some embodiments herein.

In some embodiments of the cathode active material, the thickness of the first coating layer including the NiO-like phase is remarkably thin in a state in which the formation of impurity such as NiO-like phase acting as a resistive element of the surface is suppressed as much as possible, as compared with a conventional preparation process. In some embodiments, the thickness of the first coating layer on the primary particle may be about 2.5 nm or less, about 2.4 nm or less, about 2.3 nm or less, about 2.2 nm or less, about 2.1 nm or less, about 2.0 nm or less, about 1.9 nm or less, about 1.8 nm or less, about 1.7 nm or less, about 1.6 nm or less, about 1.5 nm or less, about 1.4 nm or less, about 1.3 nm or less, about 1.2 nm or less, about 1.1 nm or less, or about 1.0 nm or less. The above thicknesses are merely examples, and other thicknesses are also possible. In some embodiments, the resistance of the cathode active material may be reduced within the thickness range, thereby improving the capacity and cycle characteristics of a lithium secondary battery.

According to an embodiment, the average particle diameter of the primary particles may be about 50 nm to about 2 μm. For example, the average particle diameter of the primary particles may be about 50 nm to about 500 nm, specifically, about 100 nm to about 200 nm. Within the above range, the life characteristics of a lithium secondary battery may be improved.

According to an embodiment, the average particle diameter of the secondary particles may be about 1 μm to about 50 μm. For example, the average particle diameter of the secondary particles may be about 1 μm to about 20 μm, specifically, about 1 μm to about 10 μm. Within the above range, a cathode active material having improved charge-discharge characteristics may be obtained.

As used herein, the average particle diameter means "D50", which is a particle diameter equivalent to 50% of the smallest particle when the total particle volume is 100%, in the distribution curve accumulated in order of the smallest particle to the largest particle. The D50 may be measured by methods well known to those skilled in the art, for example, may be measured by a particle size analyzer, a transmission electron microscopy (TEM) or a SEM image.

According to an embodiment, the secondary particle may further include a second coating layer on a part of the surface of the secondary particle, the coating layer containing a metal compound of cobalt (Co) and at least one selected from Group 2 elements, Group 12 elements, and Group 13 elements. The second coating layer may prevent surface damage occurring during the process of washing the cathode active material, thereby preventing the deterioration of life characteristics of a lithium secondary battery.

In some embodiments of the metal compound of cobalt (Co) and at least one selected from Group 2 elements, Group 12 elements, and Group 13 elements contained in the second coating layer disposed on the surface of the secondary particle, Examples of the Group 2 elements may include magnesium (Mg), calcium (Ca), strontium (Sr), barium (Ba), and combinations thereof. Further, an example of the Group 12 elements may include zinc (Zn), and Examples of the Group elements may include aluminum (Al), gallium (Ga), indium (In), thallium (Ta), and combinations thereof.

In some embodiments, the metal compound containing cobalt (Co) and the Group 2 element, the Group 12 element, the Group 13 element or a combination thereof may include a metal alloy (MxM'y), a metal oxide (MOx), a metal sulfide (MSx), a metal chloride (MClx), a metal nitride (MNx), a metal fluoride (MFx), a metal phosphide (M(PO4)x), a metal alkoxide, or a combination thereof.

In some embodiments, the cobalt composite oxide containing cobalt (Co) and the Group 2 element, the Group 12 element, the Group 13 element or a combination thereof may be a compound represented by Formula 4 below.

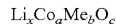 [Formula 4]

$Li_xCo_aMe_bO_c$ wherein in Formula 4, Me is at least one selected from Group 2 elements, Group 12 elements, and Group 13 elements, and 0≤x≤1.1, 0<a≤3, 0<b≤3, and 1.9≤c≤4.1 are satisfied.

In some embodiments, the cobalt composite oxide containing cobalt (Co) and the Group 2 element, the Group 12 element, the Group 13 element or a combination thereof does not contain lithium when x is 0, as seen from Formula 2 above.

The above Formula 4 may be understood as a composition formula including the elements shown in Formula 4.

According to an embodiment, the metal oxide may be $Co_3O_4$, MgO, $Li_xCoO_2$ (0<x≤1.5), or a combination thereof. Specific examples of the metal oxide may include a mixture of $Co_3O_4$ and MgO, a $Co_3O_4$.MgO complex, a mixture of $LiCoO_2$ and MgO, a $LiCoO_2$.MgO complex, a mixture of $LiCoO_2$ and $Co_3O_4$, a $LiCoO_2$.$Co_3O_4$ complex, a mixture of $LiCoO_2$, $Co_3O_4$ and MgO, and a $LiCoO_2$.$Co_3O_4$.MgO complex. The above metal oxides are merely examples, and other metal oxides are also possible.

In Formula 4 above, x is, for example, 0 or 1.0 to 1.09, a is 1 to 3, b is 1 to 3, and c is 1 to 4.

In Formula 4 above, Me is aluminum (Al), gallium (Ga), magnesium (Mg), calcium (Ca), barium (Ba), zinc (Zn), or a combination thereof.

Examples of the compound of Formula 4 may include $Li_xCo_aAl_bO_4$, $Li_xCo_aZn_bO_4$, $Li_xCo_aMg_bO_4$, $Li_xCo_aGa_bO_4$, $Li_xCo_aCa_bO_4$, and $Li_xCo_aBa_bO_4$.

For example, the compound of Formula 4 may include $LiCo_{1.5}Al_{0.5}O_4$, $LiCo_{1.5}Ga_{0.5}O_4$, $LiCo_{1.33}Ga_{0.67}O_4$, $LiCo_{1.33}Ca_{0.67}O_4$, $LiCo_{1.33}Ba_{0.67}O_4$, $LiCo_{1.33}Zn_{0.67}O_4$, $LiCo_{1.2}Mg_{0.8}O_4$, $LiCo_{1.2}Ga_{0.8}O_4$, $LiCo_{1.2}Ca_{0.8}O_4$, $LiCo_{1.2}Ba_{0.8}O_4$, $LiCo_{1.2}Zn_{0.8}O_4$, $LiCo_{1.6}Mg_{0.4}O_4$, $LiCo_{1.6}Ga_{0.4}O_4$, $LiCo_{1.6}Ca_{0.4}O_4$, $LiCo_{1.6}Ba_{0.4}O_4$, $LiCo_{1.6}Zn_{0.4}O_4$, $LiCo_{0.8}Mg_{1.2}O_4$, $LiCo_{0.8}Ga_{1.2}O_4$, $LiCo_{0.8}Ba_{1.2}O_4$, $LiCo_{0.8}Ba_{1.2}O_4$, $LiCo_{0.8}Zn_{1.2}O_4$, $LiCo_{0.4}Mg_{1.6}O_4$, $LiCo_{0.4}Ga_{1.6}O_4$, $LiCo_{0.4}Ca_{1.6}O_4$, $LiCo_{0.4}Ba_{1.6}O_4$, and $LiCo_{0.4}Zn_{1.6}O_4$. The above compounds are merely examples, and other compounds are also possible. The content of the metal compound may be about 0 parts by weight to about 5 parts by weight, for example, about 0.1 parts by weight to about 2 parts by weight, or about 0.5 parts by weight to about 1 part by weight, based on 100 parts by weight of the lithium transition metal oxide included in the secondary particle. Within the above range, the surface damage of the cathode active material may be effectively suppressed, thereby preventing the deterioration of life characteristics of a lithium secondary battery.

In some embodiments, the thickness of the second coating layer may be about 1 µm or less, for example, about 500 nm or less, for example, about 100 nm or less, for example, about 50 nm or less. The second coating layer may be formed to have a thickness of about 0.1 nm or more. The thickness of the second coating layer may be, for example, about 1 nm to about 40 nm. Within the above non-limiting range, the surface damage of the cathode active material may be effectively suppressed, thereby preventing the deterioration of life characteristics of a lithium secondary battery according to some embodiments herein. The above thicknesses are merely examples, and other thicknesses are also possible.

In some embodiments, the second coating layer may be uniformly formed on the surface of the secondary particle of the cathode active material. When washing is performed using a weakly acidic or neutral organic buffer in the process of preparing the cathode active material, the precipitation rate of a coating material may be reduced by the pH buffer action of the organic buffer. During washing and surface coating processes, uniform precipitation coating may be continuously performed on the surface of the cathode active material due to the anion providing effect of the coating material. The second coating layer uniformly formed on the surface of the secondary particle by the uniform precipitation coating may effectively suppress the surface damage of the cathode active material, thereby maximally preventing the degradation of life characteristics of a lithium secondary battery.

In some embodiments, the cathode active material may be prepared by the following method.

According to an embodiment, a method of preparing the cathode active material includes: primarily heat-treating a mixture including a transition metal precursor and a lithium source; washing a resulting product of the primary heat treatment using a solvent including a weakly acidic or neutral organic buffer, and secondarily heat-treating the washed resulting product.

The transition metal precursor is not particularly limiting. For example, a transition metal hydroxide type precursor may be used.

In some embodiments, the transition metal hydroxide type precursor may be synthesized using, for example, coprecipitation. In a non-limiting example, transition metal hydroxide type precursor may be obtained by mixing sulfate, nitrate, carbonate, acetate, chloride in the form of a salt dissolved in water with a transition metal source in the form of oxide to prepare an aqueous solution and then adding a base such as NaOH, NH$_4$OH, or KOH to the aqueous solution as a pH adjuster.

In a non-limiting example, as one or more transition metal precursors, one or more of a nickel precursor, a cobalt precursor, a manganese precursor, and optionally a precursor of another metal may be used. For example, the nickel precursor may be nickel sulfate or nickel acetate, the cobalt precursor may be cobalt sulfate or cobalt acetate, the manganese precursor may be manganese sulfate or manganese acetate, and the precursor of another metal may be copper sulfate, tin chloride, titanium isopropoxide, or ruthenium acetylacetate. The mixing molar ratio of the precursors may be selected according to the composition of a target.

Non-limiting examples of the lithium source may include, but are not limited to, lithium salts including lithium cations, for example, lithium nitrate (LiNO$_3$), lithium acetate (CH$_3$COOLi), lithium carbonate (Li$_2$CO$_3$), lithium hydroxide (LiOH), and combinations thereof.

In some embodiments, the mixture may further include a doping source for selectively doping the cathode active material.

The doping element-containing compound as the doping source may be a compound in the form of hydroxide, sulfate, nitrate, carbonate, halide, acetate, chloride, or oxide of the doping element, or a compound in the form of isopropanol, acetyl acetonate, or nitrate, but is not limited thereto.

According to an embodiment, the method of mixing the transition metal precursor, the lithium source, and the optional doping source may be carried out by a wet or dry method, but the embodiments are not particularly limited thereto.

In the wet method, the transition metal precursor, the lithium source, and the optional doping source may be mixed in a solvent such as alcohol to form an alcohol solution, and then the alcohol solution may be dried to prepare a dry mixture. In the dry method, the transition metal precursor, the lithium source, and the optional doping source may be mechanically mixed in a powder state to prepare a mixture. The dry method may be used in terms of facilitation of preparation.

The preparation of the mixture by the dry method may be performed by ball milling. The balls used in ball milling may be, for example, zirconia balls, and the kind of ball is not limited. The size of the ball may be, for example, about 0.3 mm to about 10 mm, but is not limited thereto. The above range is merely an example, and other ranges are also possible. Ball milling may be performed, for example, for about 4 hours to about 48 hours. The above range is merely an example, and other ranges are also possible. Various methods other than the ball milling may be used if reactants may be uniformly mixed.

The mixture obtained in this way may be primarily heat-treated. For example, the primary heat treatment may be performed at a temperature of about 600° C. to about 1000° C. under an air or oxygen atmosphere. For example, the primary heat treatment may be performed at a temperature of about 600° C. to about 800° C. The temperature and time of the primary heat treatment may be appropriately adjusted within the range capable of providing more improved physical properties in consideration of the kind of metal.

Next, in order to remove residual lithium compounds (for example, LiOH, Li$_2$CO$_3$, and the like) on the active material surface that is a resulting product of the primary heat treatment, the resulting product of the primary heat treatment is washed using a solvent such as water. In this case, in order to suppress the formation of a NiO-like crystalline phase, a solvent containing a weakly acidic or neutral organic buffer is used.

The weakly acidic or neutral organic buffer may act as a pH buffer between a washing solution and the active material surface that is a resulting product of the primary heat treatment to maintain the pH at the interface to about 7, thereby preventing the ion exchange of Li$^+$ on the surface of the active material and H$^+$ in the washing solution. As a result, the formation of a NiO-like crystalline phase acting as a resistive element on the active material surface may be suppressed.

When a coating material for surface coating of the cathode active material is added to the solvent used for washing, an effect of reducing the precipitation rate of the coating material may be exhibited by the pH buffer action of the organic buffer, and during washing and surface coating processes, uniform precipitation coating may be continuously performed on the surface of the cathode active material due to the anion providing effect of the coating material.

FIG. 1 is a schematic view for explaining an action mechanism of a weakly acidic or neutral organic buffer. As shown in FIG. 1, in the washing process for removing residual lithium compounds from the active material surface, the organic buffer may prevent the ion exchange of $Li^+$ on the surface of the active material and $H^+$ in the washing solution. As a result, the separation of protons may be suppressed, thereby causing the reduction in thickness of a NiO phase on the surface of cathode active material and the uniform coating characteristics of the surface thereof.

Figure 2:
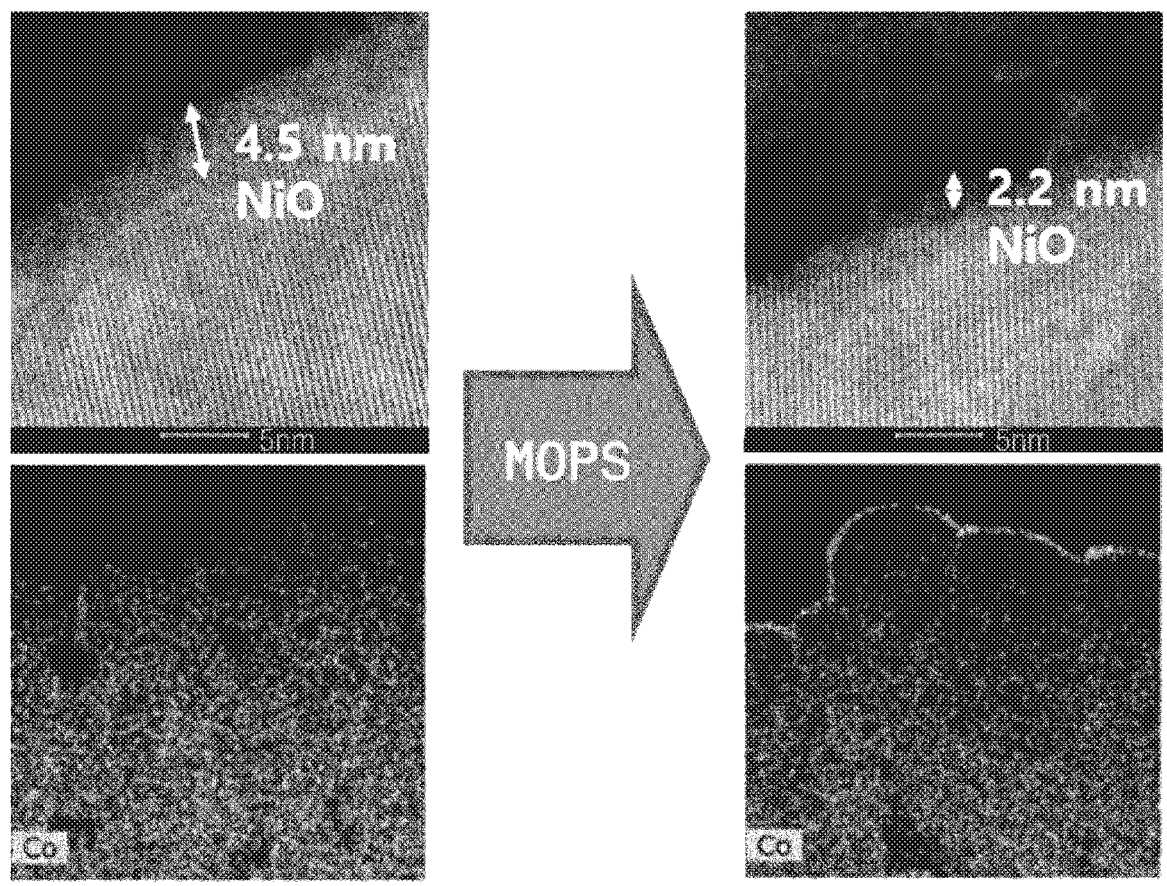
FIG. 2 is a TEM analysis photograph illustrating the reduction in thickness of a NiO phase on the surface of the cathode active material and the surface uniform coating characteristics of a Co-rich component when an organic buffer such as MOPS is used according to one embodiment.

FIG. 2 is a TEM analysis photograph illustrating the reduction in thickness of a NiO phase on the surface of the cathode active material and the surface uniform coating characteristics of a Co-rich component when an organic buffer such as MOPS is used according to one embodiment Since an improved cathode active material may be prepared by using such an organic buffer in the process of removing a residual lithium compound, initial charge-discharge coulombic efficiency, specific capacity and cycle life may be improved when the cathode active material is applied to a lithium secondary battery.

The weakly acidic or neutral organic buffer may have a pH of about 2 to about 9. The pH of the organic buffer at the interface between the active material surface and the washing solution may be maintained about 7 within the above range, so that the ion exchange of $Li^+$ on the surface of the active material surface and $H^+$ in the washing solution may be prevented, thereby suppressing the formation of a NiO-like phase acting as a resistive element of the surface of the active material. Conventionally, an ammonia buffer having a pH of 10 or more is used for washing active materials. However, in this case, the ion exchange of Lion the surface of the active material and $H^+$ in the washing solution cannot be prevented, and thus the formation of a NiO-like phase cannot be suppressed.

The organic buffer may include an amphiphilic organic compound having a sulfone group.

According to an embodiment, the amphiphilic organic compound having a sulfone group may include, but is not limited to, at least one selected from MOPS (3-(N-morpholino)propanesulfonic acid), MES (2-(N-morpholino)ethanesulfonic acid), HEPES (2-[4-(2-hydroxyethyl)piperazin-1-yl] ethanesulphonic acid), PIPES (1,4-piperazindieethanesulfonic acid), TES (N-tris(hydroxymethyl)methyl-2-aminoethanesulfonic acid), ACES (2-(carbamoylmethylamino)ethanesulfonic acid), BES (N,N-bis(2-hydroxyl-2-amino)ethanesulfonic acid), and CHES ((cyclohexylamino)ethanesulfonic acid). The above amphiphilic organic compounds are merely examples, and other amphiphilic organic compounds are also possible. According to an embodiment, the amphiphilic organic compound having a sulfone group may include MOPS.

This amphiphilic organic compound having a sulfone group is widely used in the bio-industry, and is inexpensive and environmentally friendly, which can be advantageous for mass production of cathode active materials.

The organic buffer is added to the solvent one or more times during the washing. The organic buffer may be added when the resulting product of the primary heat treatment is mixed with the solvent, or may be added one or more times in the middle of the process of introducing a coating material into the solvent during the washing process.

The organic buffer may be included in the solvent in a concentration of about 0.001 M to about 2 M. For example, the organic buffer is included in the solvent in a concentration of about 0.01 M to about 1 M, specifically, about 0.02 M to about 0.5 M. The above ranges are merely examples, and other ranges are also possible. In the above range, a buffer function capable of preventing the ion exchange of $Li^+$ on the surface of the active material and $H^+$ in the washing solution may be effectively exhibited.

In some cases, in order to improve additional battery performance, in the washing of the resulting product, a coating material for surface-coating the cathode active material is further introduced into the solvent. A surface reforming layer or a surface coating layer may be formed by the precipitation reaction on the surface of the cathode active material through the introduction of the coating material.

In order to form a coating layer containing a metal compound of cobalt (Co) and at least one selected from Group 2 elements, Group 12 elements, and Group 13 elements, a precursor material of the metal compound may be included as the coating material. The coating material may be a compound in the form of hydroxide, sulfate, nitrate, carbonate, halide, acetate, chloride, or oxide of a coating element or may be a compound in the form of isopropanol, acetyl acetate, or nitrate, but is not limited thereto.

This coating material may be mixed with the solvent one or more times before washing and/or during washing to form a coating layer containing a metal compound on the surface of the cathode active material.

After the washing, the resulting product may be dried in an oven to remove the solvent.

The resulting product washed in this way may be secondarily heat-treated, thereby reducing the thickness of a NiO-like crystalline phase on the surface thereof to 2.5 nm and obtaining a cathode active material having uniform surface coating for a lithium secondary battery.

The secondary heat treatment may be performed at about 600° C. to about 1000° C. under an air or oxygen atmosphere. For example, the secondary heat treatment may be performed at about 600° C. to about 800° C. The above ranges are merely examples, and other ranges are also possible. The temperature and time of the primary heat treatment may be appropriately adjusted within the range capable of providing more improved physical properties in consideration of the kind of metal, and the aforementioned cathode active material may be obtained within the above range.

A cathode, according to another embodiment, may include the aforementioned cathode active material.

In the preparation of the cathode, for example, the aforementioned cathode active material, a conducting agent, a binder, and a solvent are mixed to prepare a cathode slurry composition. The cathode slurry composition may be directly applied onto a cathode current collector and dried to form a cathode plate on which a cathode active material layer is formed. Alternatively, the cathode slurry composition may be cast on a separate support, and then a film obtained by peeling from the support may be laminated on a cathode current collector to form a cathode plate on which a cathode active material layer is formed.

In some embodiments disclosed herein, as the conducting agent, carbon black, graphite fine particles, natural graphite, artificial graphite, acetylene black, ketjen black, carbon fiber, carbon nanotubes, graphene; metal powder, metal fiber or metal tube of copper, nickel, aluminum, or silver; and conductive polymers such as polyphenylene derivatives may be used. However, the embodiments are not limited thereto, and any conducting agent may be used as long as it is used in the art.

In some embodiments disclosed herein, as the binder, a vinylidene fluoride/hexafluoropropylene copolymer, polyvinylidene fluoride, polyacrylonitrile, polymethyl methacrylate, polytetrafluoroethylene (PTFE), a mixture of the aforementioned polymers, styrene-butadiene rubber-based polymers may be used. As the solvent, N-methylpyrrolidone (NMP), acetone, or water may be used. However, the embodiments are not limited thereto, and any solvent may be used as long as it is used in the art.

In some embodiments disclosed herein, it is also possible to form pores inside the electrode plate by adding a plasticizer to the cathode slurry composition.

In some embodiments disclosed herein, the content of the cathode active material, the content of the conducting agent, the content of the binder, and the content of the solvent are levels generally used in lithium secondary batteries. In some embodiments disclosed herein, at least one of the conducting agent, the binder, and the solvent may be omitted depending on the use and configuration of the lithium secondary battery.

In some embodiments disclosed herein, the cathode may include the aforementioned cathode active material alone, or may further include a conventional cathode active material including at least one other technical feature, such as composition and particle size, in addition to the aforementioned cathode active material.

As a generally usable cathode active material, a lithium-containing metal oxide may be used without limitation, as long as it is generally used in the art. As the lithium-containing metal oxide, for example, at least one selected from composite oxides of lithium and metal selected from cobalt, manganese, nickel, and combinations thereof may be used. Specifically, as the lithium-containing metal oxide, a compound represented by any one of Formulae of $Li_aA_{1-b}B_bD_2$ (where, $0.90 \leq a \leq 1$, $0 \leq b \leq 0.5$); $Li_aE_{1-b}B_bO_{2-c}D_c$ (where, $0.90 \leq a \leq 1$, $0 \leq b \leq 0.5$, $0 \leq c \leq 0.05$); $LiE_{2-b}B_bO_{4-c}D_c$ (where, $0 \leq b \leq 0.5$, $0 \leq c \leq 0.05$); $Li_aNi_{1-b-c}Co_bB_cD_\alpha$ (where, $0.90 \leq a \leq 1$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (where, $0.90 \leq a \leq 1$, $0 \leq b \leq 0.5$, $0 \leq c \leq 0.05$, $0 < \alpha < 2$); $Li_aNi_{1-b-c}Co_bB_cO_{2-\alpha}F_2$ (where, $0.90 \leq a \leq 1$, $0 \leq b \leq 0.5$, $0 \leq c \leq 0.05$, $0 < \alpha < 2$); $Li_aNi_{1-b-c}Mn_bB_cD_\alpha$ (where, $0.90 \leq a \leq 1$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (where, $0.90 \leq a \leq 1$, $0 \leq b \leq 0.5$, $0 \leq c \leq 0.05$, $0 < \alpha < 2$); $Li_aNi_{1-b-c}Mn_bB_cO_{2-\alpha}F_2$ (where, $0.90 \leq a \leq 1$, $0 \leq b \leq 0.5$, $0 \leq c \leq 0.05$, $0 < \alpha < 2$); $Li_aNi_bE_cG_dO_2$ (where, $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (where, $0.90 \leq a \leq 1$, $0.001 \leq b \leq 0.1$.); $Li_aCoG_bO_2$ (where, $0.90 \leq a \leq 1$, $0.001 \leq b \leq 0.1$.); $Li_aMnG_bO_2$ (where, $0.90 \leq a \leq 1$, $0.001 \leq b \leq 0.1$); $Li_aMn_2G_bO_4$ (where, $0.90 \leq a \leq 1$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. The above ranges are merely examples, and other ranges are also possible.

In Formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_xO_{2x}$ ($x=1, 2$), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), or $LiFePO_4$. The above ranges are merely examples, and other ranges are also possible.

In one or more embodiments, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, a rare-earth element, or a mixture thereof may be used. In the process of forming the coating layer, any coating method may be used as long as this compound may be coated with such elements by a method that does not adversely affect the physical properties of the cathode active material (for example, spray coating, dipping or the like). This coating method will be understood by those skilled in the art, so that a detailed description thereof will be omitted.

The cathode current collector is generally made to have a thickness of about 3 μm to about 500 μm. The cathode current collector is not particularly limited as long as it has conductivity without inducing a chemical change in the battery. For example, as the cathode current collector, copper, stainless steel, aluminum, nickel, titanium, fired carbon, copper or stainless surface-treated with carbon, nickel, titanium or silver, or an aluminum-cadmium alloy may be used. The cathode current collector may be formed to have irregularities on the surface thereof to increase the bonding force of the cathode active material, and may be used in various forms such as film, sheet, foil, net, porous body, foam, and non-woven fabric.

The density of the cathode may be at least 2.0 g/cc.

A lithium secondary battery according to another embodiment may employ a cathode including the cathode active material. The lithium secondary battery includes: a cathode including the cathode active material; an anode disposed to face the cathode; and an electrolyte disposed between the cathode and the anode.

In the lithium secondary battery, the positive electrode is prepared according to the aforementioned method of preparing the cathode.

An anode may be prepared as follows. The anode may be prepared in the same manner as in the cathode, except that an anode active material is used instead of the cathode active material. Further, in an anode slurry composition, a conducting agent, a binder, and a solvent may be the same as those mentioned in the case of the cathode.

For example, an anode active material, a binder, a solvent, and optionally a conducting agent may be mixed to prepare an anode slurry composition, and the anode slurry composition may be directly applied onto an anode current collector to prepare an anode plate. Alternatively, the anode slurry composition may be cast on a separate support, and then an anode active material peeled from the support may be laminated on an anode current collector to form an anode plate.

The anode active material may be used without limitation. Any anode active material may be used as long as it may be used in the art. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y alloy (Y is an alkaline metal, an alkaline earth metal, a group 13 element, a group 14 element, a transition metal, or a combination thereof, not Si), or a Sn—Y alloy (Y is an alkaline metal, an alkaline earth metal, a group 13 element, a group 14 element, a transition metal, or a combination thereof, not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

The carbon-based material may be crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke.

The content of the anode active material, the content of the conductive material, the content of the binder, and the content of the solvent are levels generally used in the lithium secondary battery.

The anode current collector is generally made to have a thickness of about 3 μm to about 500 μm. The anode current collector is not particularly limited as long as it has conductivity without inducing a chemical change in the battery. For example, as the anode current collector, copper, stainless steel, aluminum, nickel, titanium, fired carbon, copper or stainless surface-treated with carbon, nickel, titanium or silver, or an aluminum-cadmium alloy may be used. The anode current collector may be formed to have irregularities on the surface thereof to increase the bonding force of the anode active material, and may be used in various forms such as film, sheet, foil, net, porous body, foam, and non-woven fabric.

The cathode and the anode may be separated from each other by a separator. As the separator, any separator may be used as long as it is commonly used in a lithium battery. A separator having low resistance to the movement of ions in the electrolyte and superior in electrolyte wettability may be used. For example, the separator may include any one selected from glass fiber, polyester, teflon, polyethylene, polypropylene, polytetrafluoroethylene (PTFE), and combinations thereof, and may be made in the form of nonwoven fabric or woven fabric. The separator has a pore diameter of about 0.01 μm to about 10 μm, and has a thickness of about 5 μm to about 300 μm.

A non-aqueous electrolyte containing a lithium salt is composed of a non-aqueous electrolyte and lithium. As the non-aqueous electrolyte, a solid electrolyte or an inorganic solid electrolyte may be used.

As the non-aqueous electrolyte, for example, an aprotic organic solvent such as N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl pyropionate, or ethyl propionate. The above non-aqueous electrolytes are merely examples, and other non-aqueous electrolytes are also possible.

As the organic solid electrolyte, for example, a polyethylene derivative, a polyethylene oxide derivative, a polypropylene oxide derivative, a phosphate ester polymer, polyagitation lysine, polyester sulfide, polyvinyl alcohol, polyvinylidene fluoride, or a polymer containing an ionic dissociation group may be used.

As the inorganic solid electrolyte, for example, lithium nitride, lithium halide, or lithium sulfate such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$ may be used. The above inorganic solid electrolytes are merely examples, and other inorganic solid electrolyte are also possible.

The lithium salt may be used without limitation as long as it is generally used in lithium batteries. As the lithium salt that is easily dissolved in the non-aqueous electrolyte, for example, at least one of, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, 4-lithium phenylborate, and lithium amide may be used. The above lithium salts are merely examples, and other lithium salts are also possible.

Lithium secondary batteries may be classified into lithium ion batteries, lithium ion polymer batteries, and lithium polymer batteries depending on the type of separator and electrolyte used, may be classified into cylindrical batteries, rectangular batteries, coin-shaped batteries, and pouch-shaped batteries depending on shape, and may be classified into bulk-type batteries and thin film-type batteries depending on size.

Methods for manufacturing these batteries are well known in the art, so that detailed descriptions thereof will be omitted.

Figure 16:
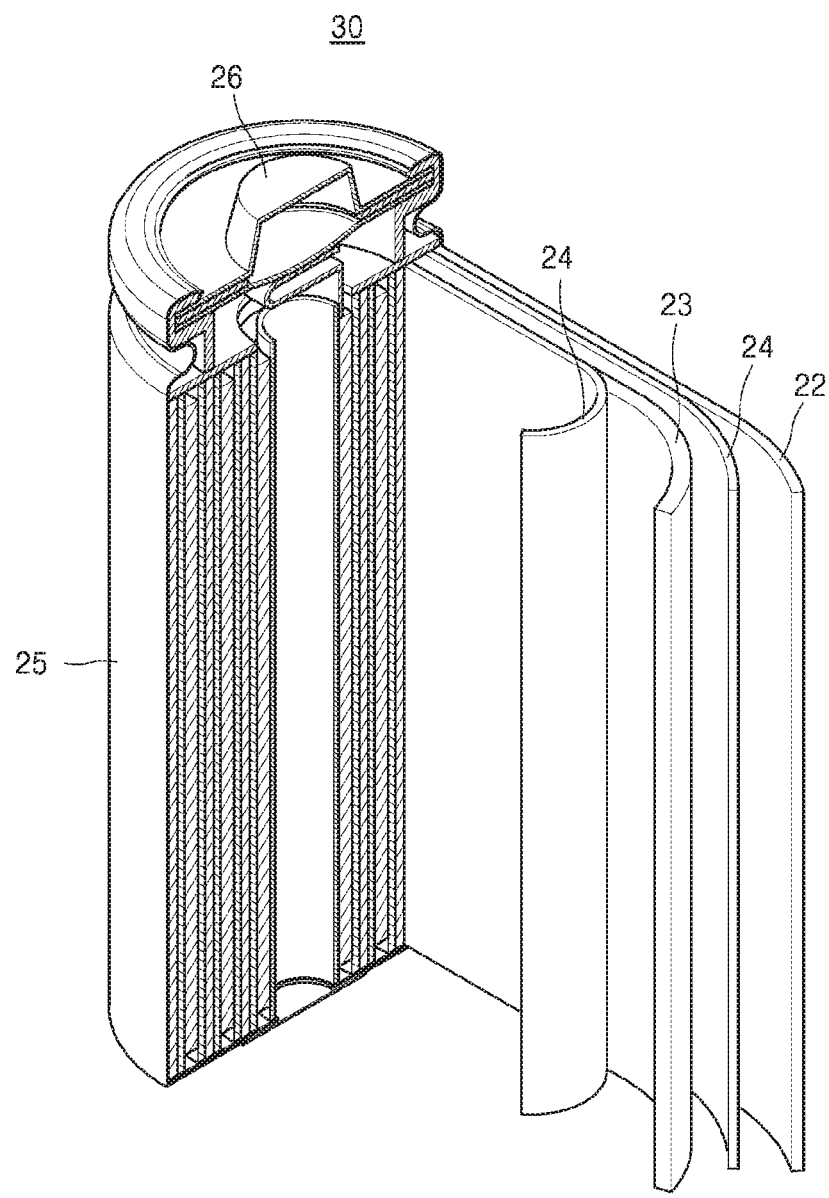
FIG. 16 is a schematic view illustrating the structure of a lithium secondary battery according to an embodiment.

FIG. 16 is a schematic view illustrating the structure of a lithium secondary battery according to an embodiment.

Referring to FIG. 16, the lithium secondary battery 30 includes a cathode 23, an anode 22, and a separator 24 between the cathode 23 and the anode 22. The cathode 23, the anode 22, and the separator 24 are wound or folded and accommodated in a battery case 25. Then, an electrolyte is injected into the battery case 25, and the battery case 25 is sealed with a sealing member 26 to complete the lithium secondary battery 30. The battery case 5 may have a cylindrical shape, a rectangular shape, or a thin film shape. The lithium secondary battery 30 may be a lithium ion battery.

The lithium secondary battery may be used as a power source for small devices such as mobile phones and portable computers, and may be used as a unit battery for a medium and large device battery module including a plurality of batteries.

Examples of the medium and large devices may include, but are not limited to, power tools, electric vehicles EVs including a hybrid electric vehicle (HEV), and a plug-in hybrid electric vehicle (PHEV); electric two-wheeled vehicles including an E-scooter; electric golf carts; electric trucks; electric commercial vehicles; and systems for power storage. In addition, the lithium secondary battery may be used for all other applications requiring high power, high voltage, and high temperature driving. For example, the lithium secondary battery may be used for applications requiring a high voltage range of 4.3V to 4.6V.

Exemplary embodiments will be described in more detail through Examples and Comparative Examples below. However, these Examples are set forth to illustrate technical ideas, and the scope of the present disclosure is not limited thereto.

Preparation of Cathode Active Material

Example 1: Buffer 0.027 M MOPS Washing and $Co_3Mg_2$ Coating $Ni_{0.88}Co_{0.08}Mn_{0.04}(OH)_2$ (Lanzhou JinTong energy storage power new material Co., Ltd., China) as an active material precursor, alumina ($Al_2O_3$) as a doping element precursor, zirconium oxide ($ZrO_2$), titanium dioxide ($TiO_2$), and $LiOH \cdot H_2O$ as a lithium precursor were mixed at a molar ratio of 0.996:0.001:0.002:0.001:1.09 to obtain a mixture. The mixture was put into a furnace, and primarily heat-treated at 750° C. for 5 hours under an oxygen atmosphere to prepare a lithium transition metal oxide doped with Al, Zr or Ti of $Li_{1.09}(Ni_{0.88}Co_{0.08}Mn_{0.04})_{1-x-y-z}Al_xZr_yTi_zO_2$ (x=0.001, y=0.002, z=0.001).

Subsequently, in order to remove residual lithium and form a surface coating layer, 100 parts by weight of the lithium transition metal oxide were mixed with 150 parts by weight of deionized water containing 0.027M MOPS (3-(N-morpholino)propanesulfonic acid) as a washing solution, and then stirred at room temperature for 20 minutes. During the stirring, in order to form a coating layer including 0.75 parts by weight of $Co_3Mg_2$ with respect to 100 parts by weight of the lithium transition metal oxide, $Co(NO_3)_2 6H_2O$ and $Mg(NO_3)_2 6H_2O$ as coating precursors were added to the washing solution at a molar ratio of Co:Mg of 3:2.

The washed resulting product was dried in an oven at 150° C. for 15 hours.

The dried resulting product was put into a furnace and then secondarily heat-treated at 720° C. for 5 hours under an oxygen atmosphere to prepare a final cathode active material.

Example 2: Buffer 0.035 M MOPS Washing and $Co_3Mg_2$ Coating

A cathode active material was prepared in the same manner as in Example 1, except that deionized water containing 0.035 M MOPS was used as a washing solution.

Example 3: Buffer 0.050 M MOPS Washing and $Co_3Mg_2$ Coating

A cathode active material was prepared in the same manner as in Example 1, except that deionized water containing 0.050 M MOPS was used as a washing solution.

Example 4: Buffer 0.050 M MOPS Washing and No Coating

A cathode active material was prepared in the same manner as in Example 1, except that deionized water containing 0.050 M MOPS was used as a washing solution, and a coating precursor for forming a surface coating layer was not added.

Comparative Example 1: No Buffer Washing and $Co_3Mg_2$ Coating

A cathode active material was prepared in the same manner as in Example 1, except that deionized water containing no MOPS was used as a washing solution.

Comparative Example 2: 0.050 M $NH_4OH$ Washing and $Co_3Mg_2$ Coating

A cathode active material was prepared in the same manner as in Example 1, except that deionized water containing 0.050 M $NH_4OH$ was used as a washing solution.

Comparative Example 3: No Buffer Washing and No Coating

A cathode active material was prepared in the same manner as in Example 1, except that deionized water containing no MOPS was used as a washing solution, and a coating precursor for forming a surface coating layer was not added.

Manufacture of Lithium Secondary Battery (Half Cell)

Example 5

The cathode active material prepared in Example 1, a carbon conducting agent (Denka Black), and polyvinylidene fluoride (PVdF) were mixed at a weight ratio of 92:4:4 to obtain a mixture, and the mixture was mixed with N-methylpyrrolidone (NMP) in an agate mortar to prepare a slurry. The slurry was applied onto an aluminum current collector having a thickness of 15 μm by bar coating, dried at room temperature, further dried in vacuum at 120° C., and then rolled and punched to prepare a cathode plate having a thickness of 45 μm.

Based on the prepared cathode plate, a coin-shaped half cell was manufactured using lithium metal as a counter electrode, using a PTFE separator, and using a solution in which 1.15M $LiPF_6$ is dissolved in a mixed solvent of ethylene carbonate (EC), ethylmethyl carbonate (EMC) and dimethyl carbonate (DMC) (volume ratio 3:4:3) as an electrolyte.

Examples 6 to 8

Coin-shaped half cells were respectively manufactured in the same manner as in Example 5, except that each of the cathode active materials prepared in Examples 2 to 4 were used instead of the cathode active material prepared in Example 1.

Comparative Examples 4 to 6

Coin-shaped half cells were respectively manufactured in the same manner as in Example 5, except that each of the cathode active materials prepared in Comparative Examples 1 to 3 were used instead of the cathode active material prepared in Example 1.

Manufacture of Lithium Secondary Battery (Full Cell)

Example 9

The cathode active material prepared in Example 1, a carbon conducting agent (Denka Black), and polyvinylidene fluoride (PVdF) were mixed at a weight ratio of 92:4:4 to obtain a mixture, and the mixture was mixed with N-methylpyrrolidone (NMP) in an agate mortar to prepare a cathode active material slurry. The slurry was applied onto an aluminum current collector having a thickness of 15 μm by bar coating, dried at room temperature, further dried in vacuum at 120° C., and then rolled and punched to prepare a cathode plate having a thickness of 45 μm.

Graphite particles having an average particle size of 25 μm, a styrene-butadiene rubber (SBR) binder (ZEON), and carboxymethyl cellulose (CMC) (NIPPON A&L) were mixed at a weight ratio of 97:1.5:1.5, introduced into distilled water, and stirred for 60 minutes using a mechanical stirrer to prepare an anode active material slurry. The slurry was applied onto a copper current collector having a thickness of 10 μm by a doctor blade, dried at 100° C. for 0.5 hours using a hot air dryer, further dried in vacuum at 120° C. for 4 hours, and then rolled and punched to prepare an anode plate having a thickness of 65 μm.

Based on the prepared cathode plate and anode plate, a full cell was manufactured using a PTFE separator and using a solution in which 1.15M LiPF$_6$ is dissolved in a mixed solvent of ethylene carbonate (EC), ethylmethyl carbonate (EMC) and dimethyl carbonate (DMC) (volume ratio 3:4:3) as an electrolyte.

Examples 10 to 12

Full cells were respectively manufactured in the same manner as in Example 9, except that each of the cathode active materials prepared in Examples 2 to 4 were used instead of the cathode active material prepared in Example 1.

Comparative Examples 7 to 9

Full cells were respectively manufactured in the same manner as in Example 9, except that each of the cathode active materials prepared in Comparative Examples 1 to 3 were used instead of the cathode active material prepared in Example 1.

Evaluation Example 1: Electron Scanning Microscope (SEM) Analysis

Figure 3:
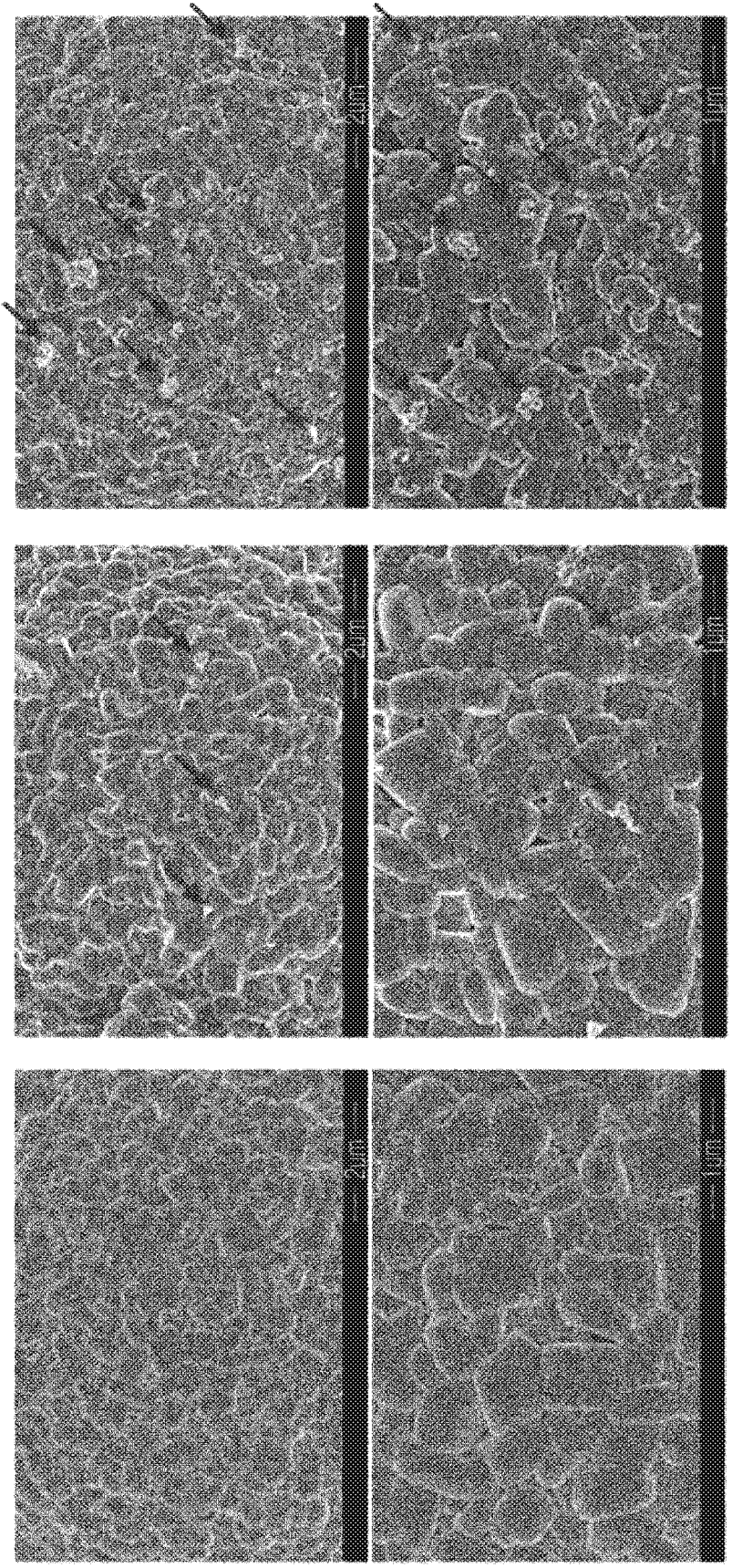
FIG. 3 illustrates electron scanning microscope (SEM) images of the surfaces of the cathode active materials prepared in Example 3, Comparative Example 1 and Comparative Example 2.

Electron scanning microscope (SEM) analysis of the surfaces of the cathode active materials prepared in Example 3 and Comparative Examples 1 and 2 were carried out, and SEM analysis results thereof are shown in FIG. 3.

As shown in FIG. 3, in the cathode active material of Comparative Example 1 in which a buffer is not applied, it may be seen that some impurity phases (red arrows) estimated to be Co$_3$O$_4$ appear on the surface thereof. In the cathode active material of Comparative Example 2 in which ammonia is applied instead of MOPS, it may be seen that many impurity phases appear on the surface thereof. In contrast, in the cathode active material of Example 3, it may be seen that non-uniform coating due to rapid precipitation of a coating material is prevented by the buffer action of MOPS, and thus impurity phases do not appear on the surface thereof.

Evaluation Example 2: Evaluation of Composition Inside and Surface of Core

Figure 4A:
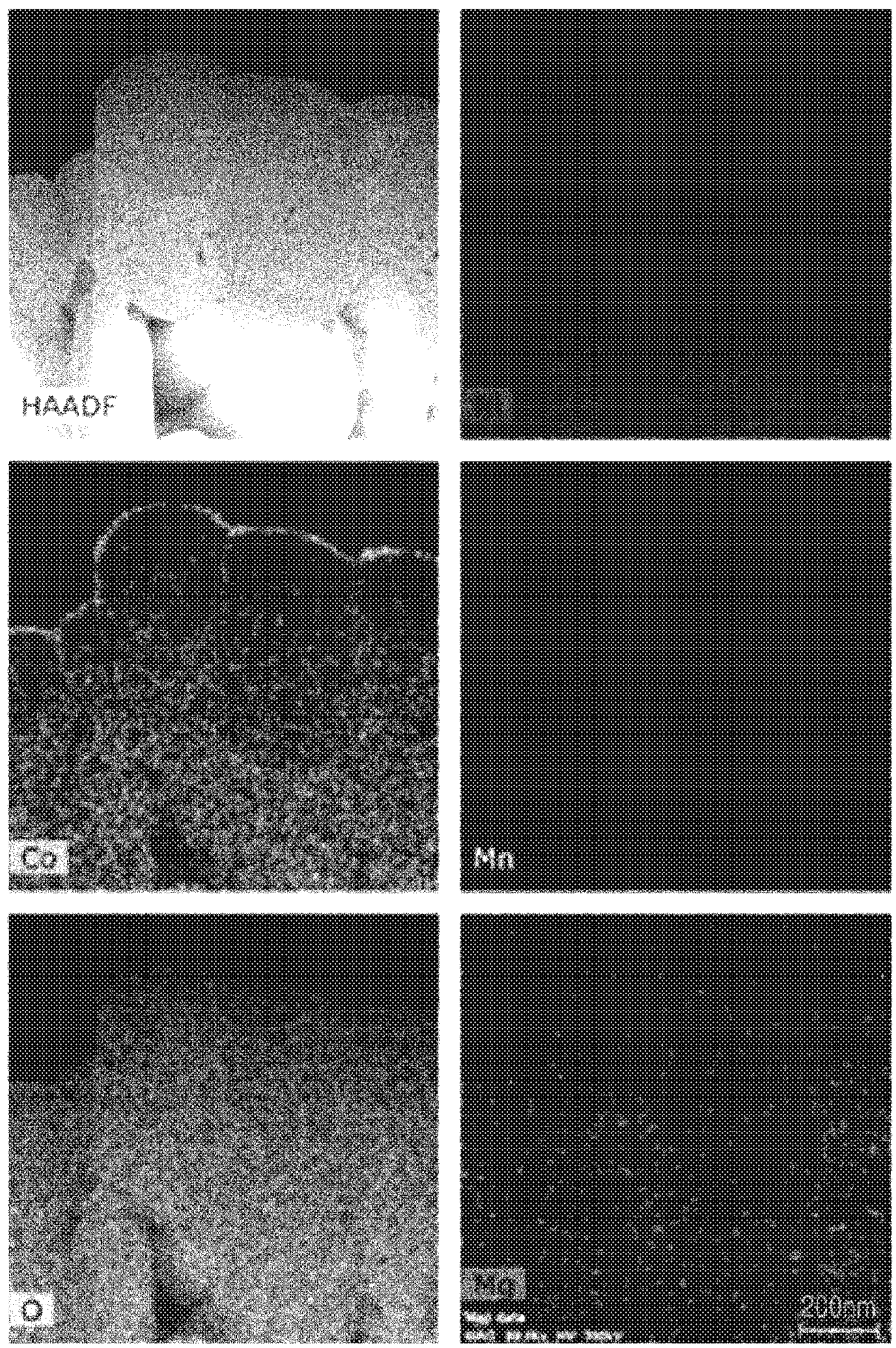
FIGS. 4A to 4C illustrate high-angle annular dark field (HAADF) STEM and energy dispersive X-ray spectroscopy (EDS) images of cross-sections of the cathode active materials prepared in Example 3, Comparative Example 1, and Comparative Example 2, respectively.
Figure 4B:
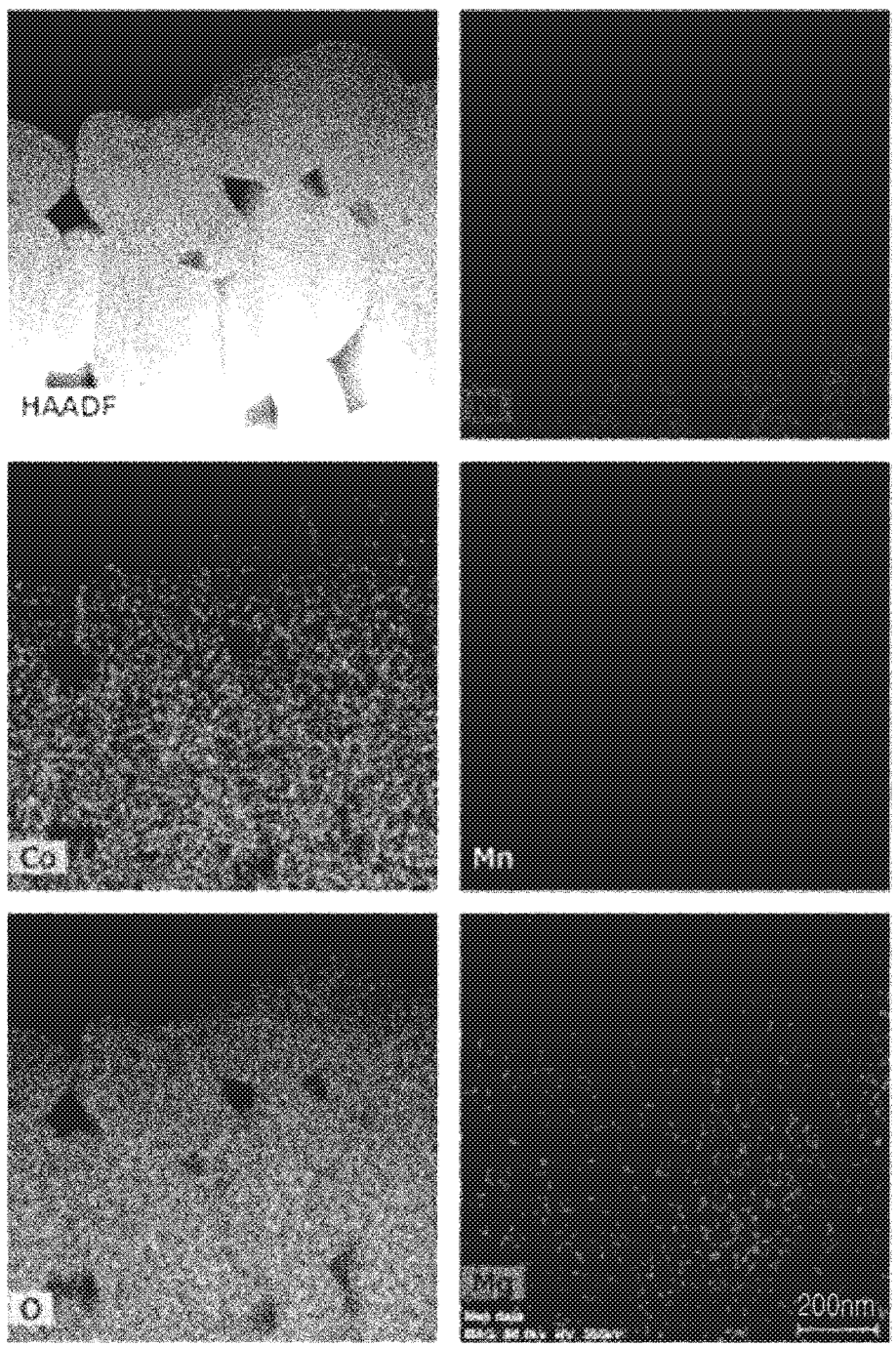
Figure 4C:
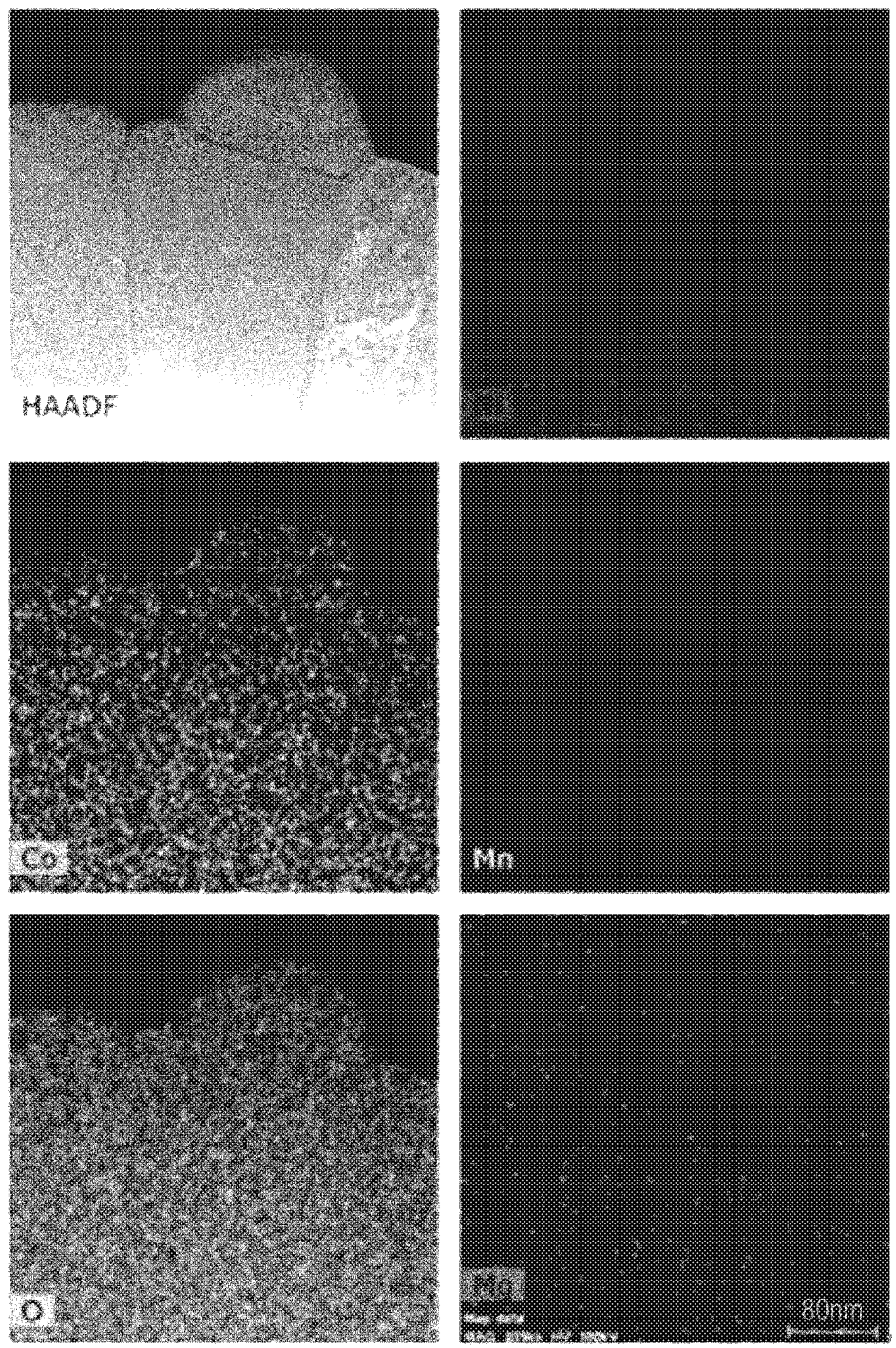

FIGS. 4A to 4C illustrate high-angle annular dark field (HAADF) STEM and energy dispersive X-ray spectroscopy (EDS) images of cross-sections of the cathode active materials prepared in Example 3, Comparative Example 1, and Comparative Example 2, respectively.

As shown in FIGS. 4A to 4C, it may be ascertained that in the cathode active material of Example 1, a uniform Co-rich coating layer is uniformly formed on the surface of the cathode active material by the washing using MOPS as compared with the cathode active material of Comparative Example 1 in which a buffer is not applied and the cathode active material of Comparative Example 2 in which ammonia is applied.

Evaluation Example 3: Evaluation of Thickness of NiO Phase

Figure 5A:
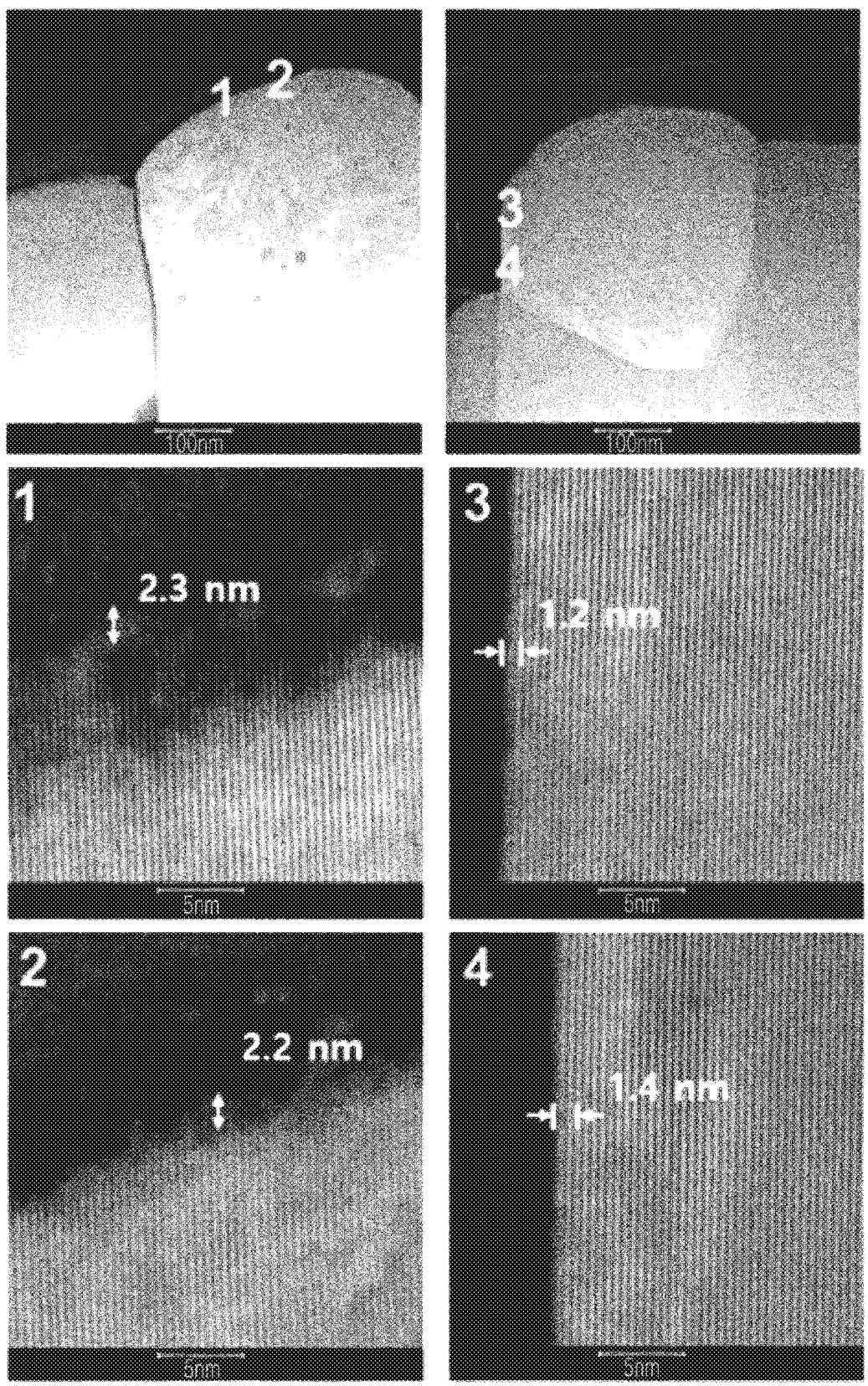
FIGS. 5A to 5C illustrate high-resolution transmission electron microscope (HRTEM) images of cross-sections of the cathode active materials prepared in Example 3, Comparative Example 1, and Comparative Example 2, respectively.
Figure 5B:
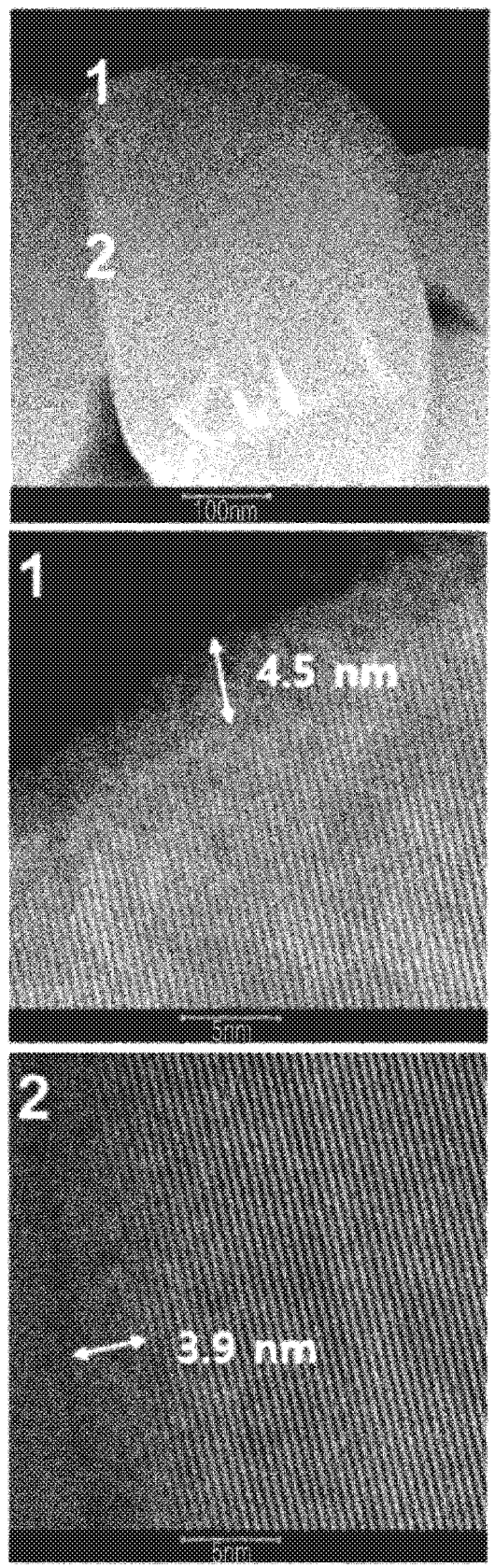
Figure 5C:
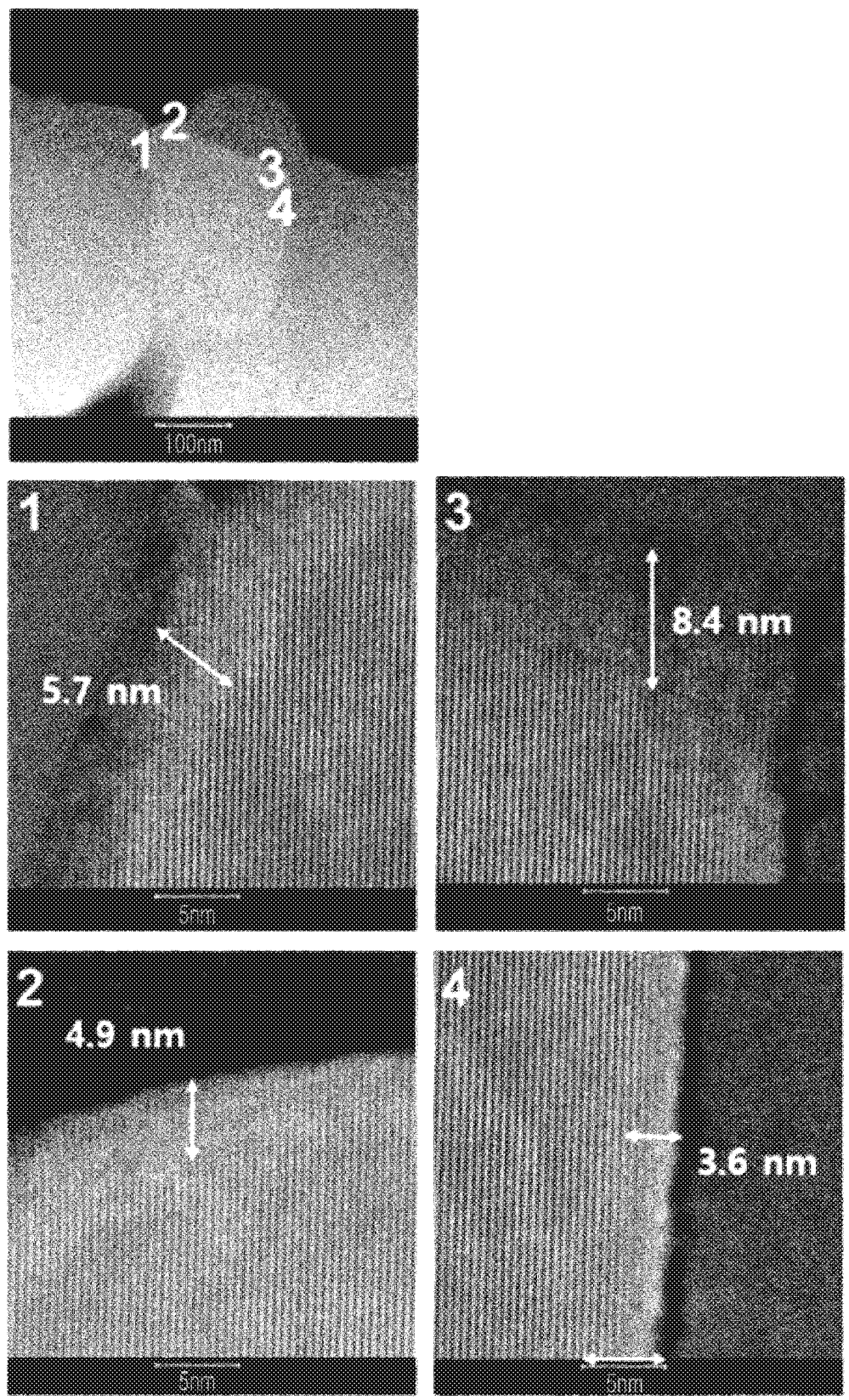

FIGS. 5A to 5C illustrate high-resolution transmission electron microscope (HRTEM) images of cross-sections of the cathode active materials prepared in Example 3, Comparative Example 1, and Comparative Example 2, respectively.

As shown in FIGS. 5A to 5C, it may be ascertained that in the cathode active material of Example 1, the thickness of a NiO-like phase on the surface of a primary particle is greatly reduced by the washing using MOPS as compared with the cathode active material of Comparative Example 1 in which a buffer is not applied and the cathode active material of Comparative Example 2 in which ammonia is applied. In the cathode active material of Example 1, the thickness of the NiO-like phase on the surface of the primary particle was measured to be 2.3 nm or less.

Evaluation Example 4: TG Pyrolysis Analysis and EGA Analysis

Figure 6:
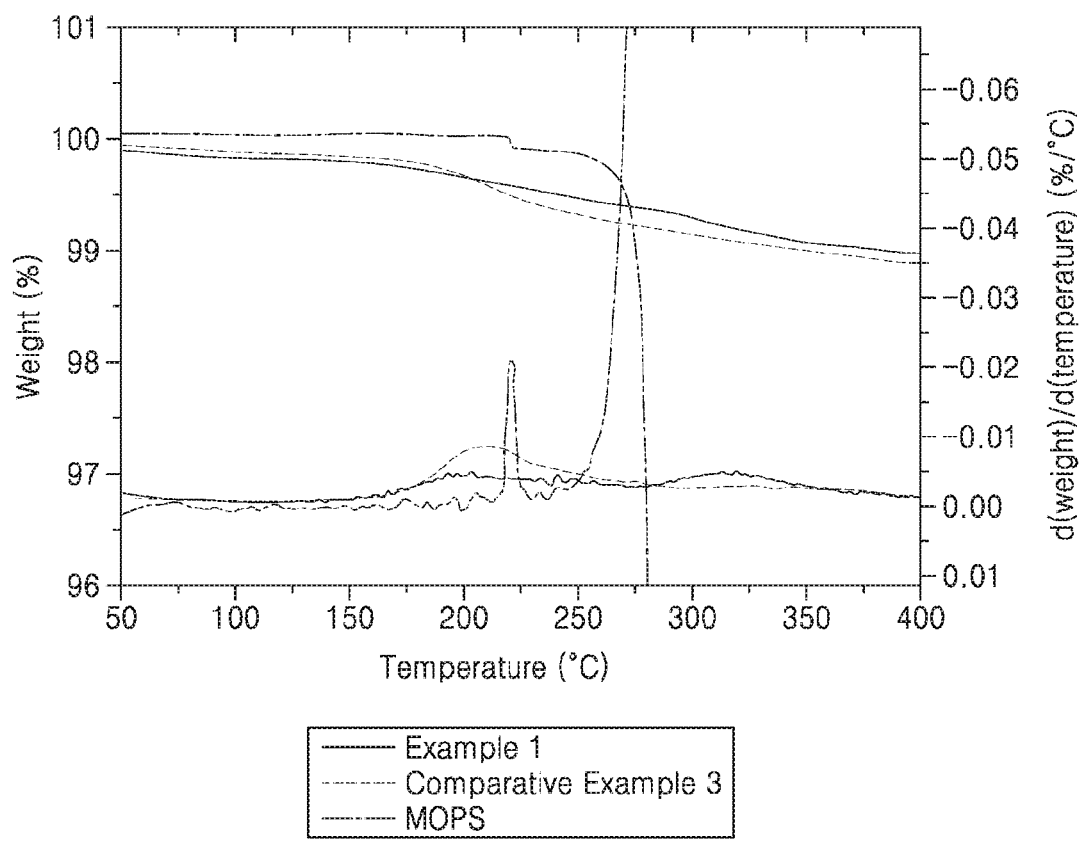
FIG. 6 is a graph illustrating thermal gravimetry (TG) pyrolysis analysis results of dried products and MOPS powder before secondary heat treatment in Example 3 and Comparative Example 1.
Figure 7:
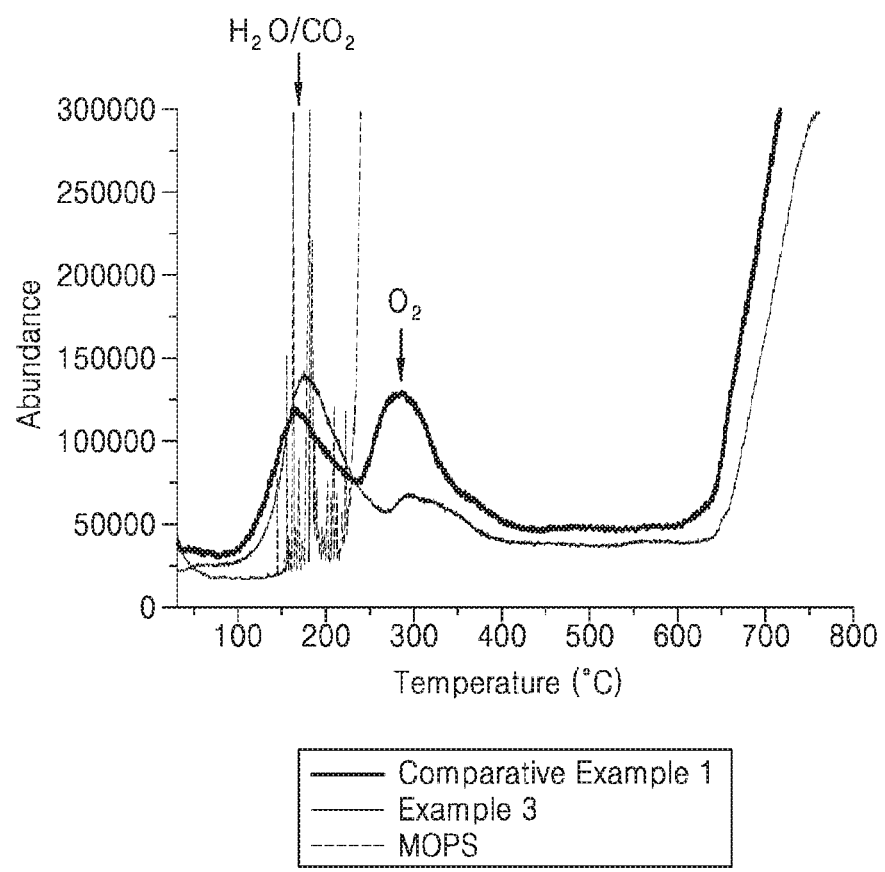
FIG. 7 is a graph illustrating the results of evolved gas analysis (EGA) of dried products and MOPS powder before secondary heat treatment in Example 3 and Comparative Example 1.

FIG. 6 illustrates thermal gravimetry (TG) pyrolysis analysis results of dried products and MOPS powder before secondary heat treatment in Example 3 and Comparative Example 1, and FIG. 7 illustrates the results of evolved gas analysis (EGA) of dried products and MOPS powder before secondary heat treatment in Example 3 and Comparative Example 1.

Based on the LiNiO$_2$ cathode active material, the expected reaction formula for secondary heat treatment is as follows.

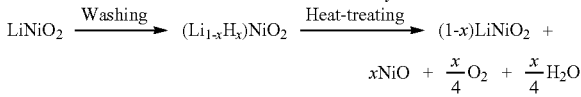

$$\text{LiNiO}_2 \xrightarrow{\text{Washing}} (\text{Li}_{1-x}\text{H}_x)\text{NiO}_2 \xrightarrow{\text{Secondary Heat-treating}} (1-x)\text{LiNiO}_2 + x\text{NiO} + \frac{x}{4}\text{O}_2 + \frac{x}{4}\text{H}_2\text{O}$$

According to the analysis based on the above reaction formula, in FIGS. 6 and 7, an exothermic peak (FIG. 6) according to the removal of protons and the pyrolysis of residual MOPS and H$_2$O/CO$_2$ decomposition gas (FIG. 7) at ~200° C. are ascertained. Further, in FIGS. 6 and 7, an exothermic peak (FIG. 6) estimated due to the formation of a NiO-like phase and O$_2$ decomposition gas (FIG. 7) at ~315° C. are ascertained.

As shown in FIGS. 6 and 7, in the case of Example 3 in which MOPS is applied, clearer exothermic peaks and gas generation peaks may be ascertained at ~200° C. which is the same temperature as the decomposition peak of MOPS powder by a residual MOPS compound, as compared with Comparative Example 1 in which MOPS is not applied. In contrast, in the case of Example 3 in which MOPS is applied, it may be ascertained that the intensity of exothermic peaks and gas generation peaks is reduced at ~315° C. by the removal of protons and the formation of a NiO-like phase according to the above reaction formula, as compared with Comparative Example 1 in which MOPS is not applied.

Accordingly, it is estimated that the cathode active material according to an embodiment may improve the performance of a lithium secondary battery by the deterioration of protonation and the reduction of a NiO-like phase due to the deterioration thereof through washing using a buffer such as MOPS.

Evaluation Example 5: Evaluation of Content of Residual Lithium

Surface residual lithium contents of the cathode active materials prepared in Examples 1 to 3 and Comparative Example 1 were measured, and the results thereof are given in Table 1 below.

The surface residual lithium contents were evaluated by measuring the content of lithium (Li) in $Li_2CO_3$ and LiOH remaining on the surface of a composite cathode active material by using a wet method (or titration method).

For a specific measurement method, for example, the method disclosed in paragraph [0054] of Japanese Patent Application Publication No. 2016-081903 may be referred to.

TABLE 1

| | Washing and coating | | $Li_2CO_3$ | LiOH | Residual lithium content |
|---|---|---|---|---|---|
| | Buffer | Coating | [wt %] | [wt %] | [ppm] |
| [wt %] | | | 1.217 | 1.006 | 4055 |
| Comparative Example 1 | N/A | 0.75 ww % $Co_3Mg_2$ | 0.214 | 0.410 | 1389 |
| Example 1 | 0.027M MOPS | 0.75 ww % $Co_3Mg_2$ | 0.163 | 0.415 | 1355 |
| Example 2 | 0.035M MOPS | 0.75 ww % $Co_3Mg_2$ | 0.132 | 0.516 | 1617 |
| Example 3 | 0.050M MOPS | 0.75 ww % $Co_3Mg_2$ | 0.156 | 0.480 | 1536 |
| Comparative Example 2 | 0.050M $NH_4OH$ | 0.75 ww % $Co_3Mg_2$ | 0.114 | 0.336 | 1018 |

Here, bare refers to a semi-finished product that is not washed after primary heat-treating. In the case of bare, it may be ascertained that in order to effectively reduce residual lithium, washing using water is applied, and even when MOPS is used, there is no difficulty in reducing residual lithium to some extent.

However, when MOPS of 0.035M or more is used, residual lithium increased slightly, but which is a range that does not adversely affect performance, and is within a range that can be improved by process control.

Evaluation Example 6: Evaluation of Charge-Discharge Characteristics at Room Temperature Charge-discharge characteristics of the lithium secondary batteries (half cells) manufactured in Examples 5, 6, and 7 and Comparative Examples 4 and 5 in two voltage ranges of 4.35 V to 2.8 V and 4.30 V to 2.8 V were evaluated as follows.

Each of the lithium secondary batteries (half cells) manufactured in Examples 5, 6, and 7 and Comparative Examples 4 and 5 was charged with a constant current of 0.1C rate at 25° C. until a voltage reached 4.35 V or 4.30 V (vs. Li), and then discharged to a constant current of 0.1C rate until the voltage reached 2.8 V (vs. Li) during discharging ($1^{st}$ cycle, formation cycle). Thereafter, charging and discharging were performed in the same voltage range as the $1^{st}$ cycle.

The lithium secondary battery having undergone the $1^{st}$ cycle was charged with a constant current of 0.33C rate at 25° C. until a voltage reached 4.35 V or 4.30 V (vs. Li), and then cut off at a current of 0.05C rate while maintaining the voltage at 4.35 V or 4.30 V in a constant voltage mode. Subsequently, this lithium secondary battery was discharged to a constant current of 0.2C rate until the voltage reached 2.8 V (vs. Li) during discharging ($2^{nd}$ cycle).

The lithium secondary battery having undergone the $2^{nd}$ cycle was charged with a constant current of 0.5C rate at 25° C. until a voltage reached 4.35 V or 4.30 V (vs. Li), and then cut off at a current of 0.05C rate while maintaining the voltage at 4.35 V or 4.30 V in a constant voltage mode. Subsequently, this lithium secondary battery was discharged to a constant current of 0.2C rate until the voltage reached 2.8 V (vs. Li) during discharging ($3^{rd}$ cycle).

The lithium secondary battery having undergone the $3^{rd}$ cycle was charged with a constant current of 0.5C rate at 25° C. until a voltage reached 4.35 V or 4.30 V (vs. Li), and then cut off at a current of 0.05C rate while maintaining the voltage at 4.35 V or 4.30 V in a constant voltage mode. Subsequently, this lithium secondary battery was discharged to a constant current of 0.33C rate until the voltage reached 2.8 V (vs. Li) during discharging ($4^{th}$ cycle).

The lithium secondary battery having undergone the $4^{th}$ cycle was charged with a constant current of 0.5C rate at 25° C. until a voltage reached 4.35 V or 4.30 V (vs. Li), and then cut off at a current of 0.05C rate while maintaining the voltage at 4.35 V or 4.30 V in a constant voltage mode. Subsequently, this lithium secondary battery was discharged to a constant current of 1C rate until the voltage reached 2.8 V (vs. Li) during discharging ($5^{th}$ cycle).

The lithium secondary battery having undergone the $5^{th}$ cycle was charged with a constant current of 0.5C rate at 25° C. until a voltage reached 4.35 V or 4.30 V (vs. Li), and then cut off at a current of 0.05C rate while maintaining the voltage at 4.35 V or 4.30 V in a constant voltage mode. Subsequently, this lithium secondary battery was discharged to a constant current of 2C rate until the voltage reached 2.8 V (vs. Li) during discharging ($6^{th}$ cycle).

The lithium secondary battery having undergone the $6^{th}$ cycle was charged with a constant current of 0.5C rate at 25° C. until a voltage reached 4.35 V or 4.30 V (vs. Li), and then cut off at a current of 0.05C rate while maintaining the voltage at 4.35 V or 4.30 V in a constant voltage mode. Subsequently, this lithium secondary battery was discharged to a constant current of 3C rate until the voltage reached 2.8 V (vs. Li) during discharging ($7^{th}$ cycle).

The lithium secondary battery having undergone the $7^{th}$ cycle was charged with a constant current of 1C rate at 25° C. until a voltage reached 4.35 V or 4.30 V (vs. Li), and then discharged to a current of 1C rate until the voltage reached 2.8 V (vs. Li) during discharging ($8^{th}$ cycle).

The lithium secondary battery having undergone the $8^{th}$ cycle was charged with a constant current of 1C rate at 25° C. until a voltage reached 4.35 V or 4.30 V (vs. Li), and then discharged to a current of 1C rate until the voltage reached 2.8 V (vs. Li) during discharging ($9^{th}$ cycle). This cycle was repeated (27 times) until the $35^{th}$ cycle under the same condition.

In all charge-discharge cycles, a stop time of 10 minutes was set after one charge-discharge cycle.

Some of the results of charge-discharge characteristics at room temperature are shown in Table 2 below and FIGS. 8 to 10.

Figure 8:
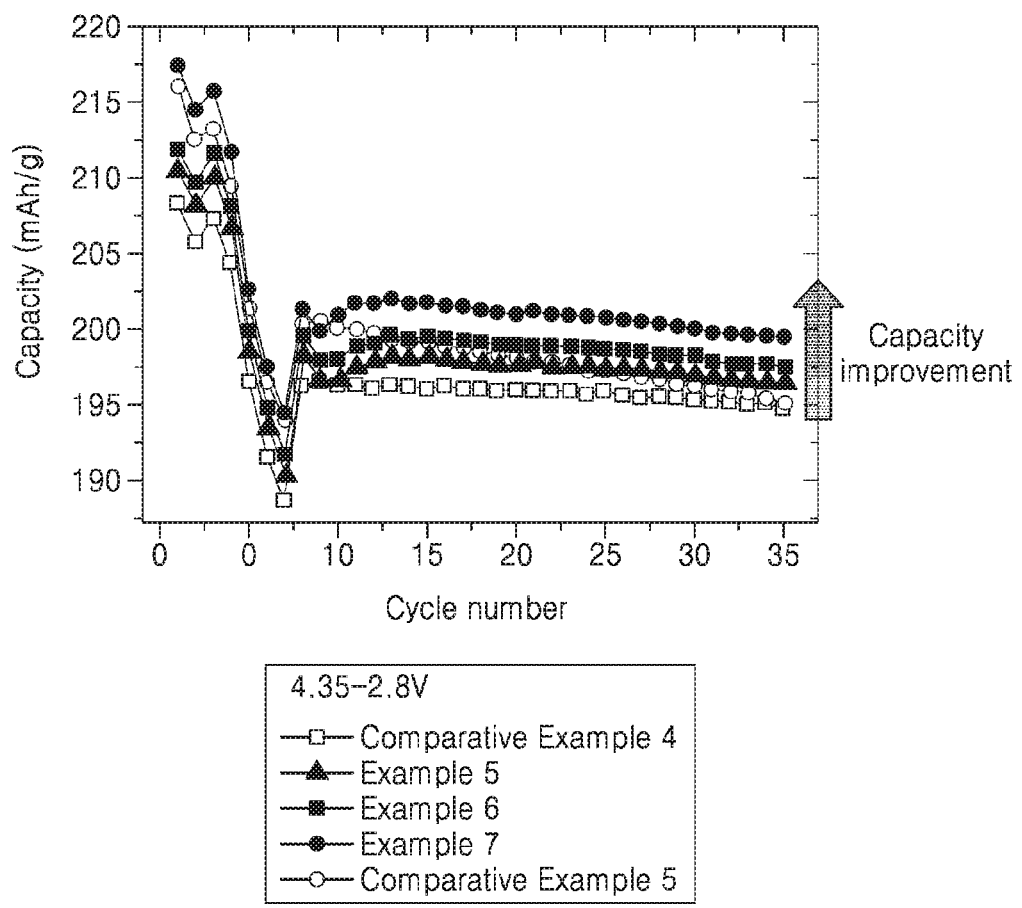
FIG. 8 is a graph illustrating the results of measuring the discharge capacities for each charge-discharge cycle in a charge-discharge voltage range of 4.35 V to 2.8 V at room temperature of the lithium secondary batteries prepared in Examples 5, 6, and 7 and Comparative Examples 4 and 5.
Figure 9:
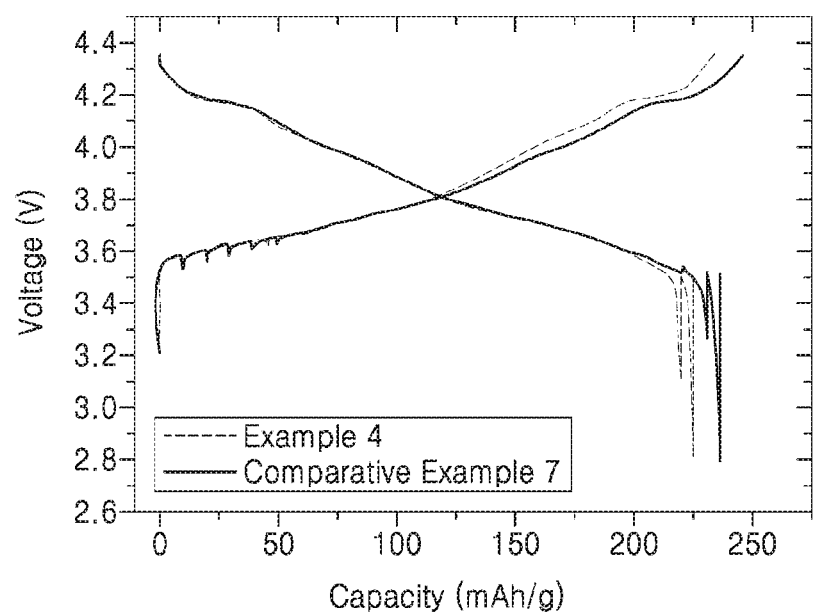
FIG. 9 is a graph illustrating the measurement result of galvanostatic intermittent titration technique (GITT) in the charge-discharge cycle at room temperature of the lithium secondary batteries prepared in Example 7 and Comparative Example 4.
Figure 10:
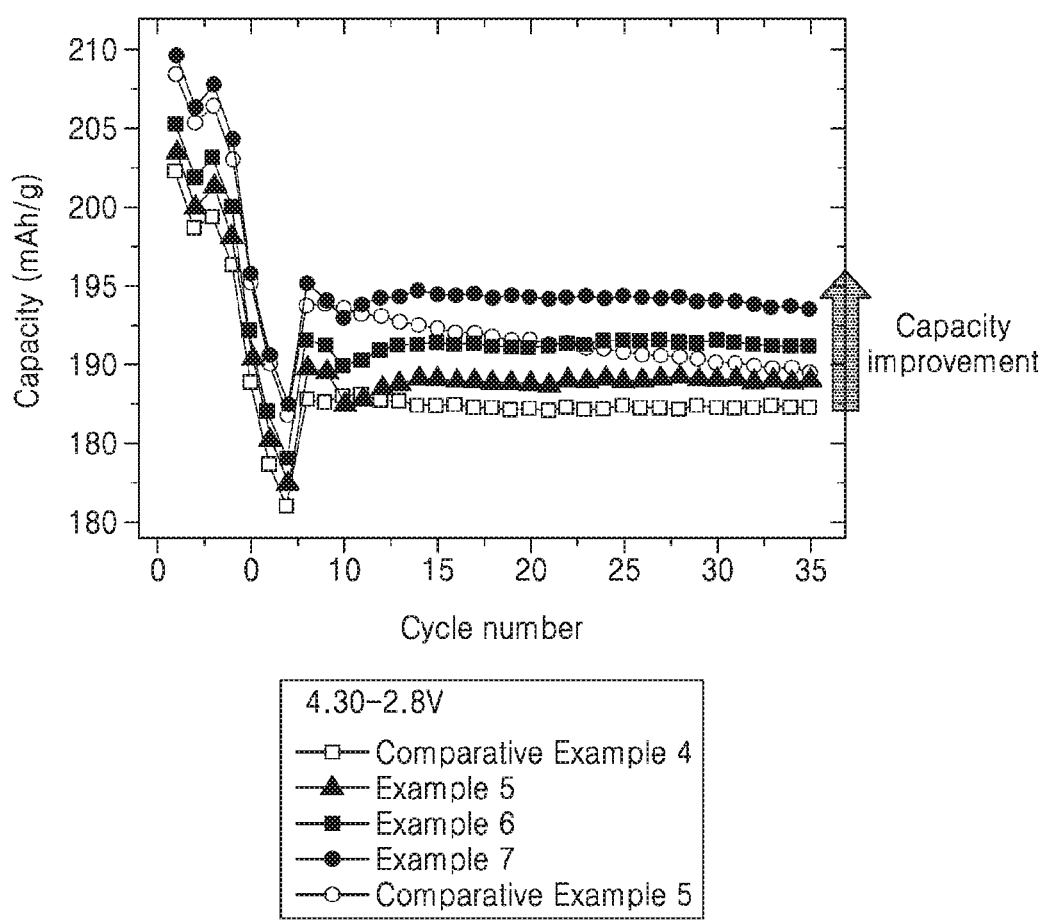
FIG. 10 is a graph illustrating the results of measuring the discharge capacities for each charge-discharge cycle in a charge-discharge voltage range of 4.30 V to 2.8 V at room temperature of the lithium secondary batteries prepared in Examples 5, 6, 7 and Comparative Examples 4 and 5.

FIG. 8 illustrates the results of measuring the discharge capacities for each cycle of the lithium secondary batteries prepared in Examples 5, 6, and 7 and Comparative Examples 4 and 5 until the 35$^{th}$ cycle, and FIG. 9 illustrates the measurement result of galvanostatic intermittent titration technique (GITT) in the 1$^{st}$ charge-discharge cycle at room temperature of the lithium secondary batteries prepared in Example 7 and Comparative Example 4.

Initial coulombic efficiency (I.E.) is defined by Equation 1 below, standard capacity is a discharge capacity in the 3$^{rd}$ cycle, and capacity retention rate in the 27$^{th}$ cycle of 1C charge-discharge is defined by Equation 2.

Initial efficiency [%]=[discharge capacity in 1$^{st}$ cycle/charge capacity in 1$^{st}$ cycle]×100   <Equation 1>

Capacity retention rate [%]=[discharge capacity in 35$^{th}$ cycle/discharge capacity in 9$^{th}$ cycle]×100   <Equation 2>

TABLE 2

| | Cathode active material treatment | | Charge capacity in 1$^{st}$ cycle [mAh/g] | Discharge capacity in 1$^{st}$ cycle [mAh/g] | Initial efficiency [%] | Standard capacity [mAh/g] | Capacity retention rate @27$^{th}$ [%] |
|---|---|---|---|---|---|---|---|
| | Buffer | Coating | | | | | |
| Comparative Example 4 | N/A | Co$_3$Mg$_2$ | 237 | 208 | 87.5 | 207 | 97.2 |
| Example 5 | 0.027M MOPS | Co$_3$Mg$_2$ | 238 | 210 | 88.3 | 209 | 99.9 |
| Example 6 | 0.035M MOPS | Co$_3$Mg$_2$ | 238 | 212 | 88.9 | 212 | 99.9 |
| Example 7 | 0.050M MOPS | Co$_3$Mg$_2$ | 238 | 217 | 91.2 | 215 | 99.9 |
| Comparative Example 5 | 0.050M NH4OH | Co$_3$Mg$_2$ | 240 | 216 | 89.8 | 213 | 97.6 |

As shown in Table 2 and FIG. 8, it may be found that in the lithium secondary batteries of Examples 5 to 7, initial efficiency, capacity, and cycle life characteristics at room temperature are improved as compared with the lithium secondary battery of Comparative Example 4. Such improved characteristics is derived from the fact that in each of the cathode active materials included in the lithium secondary batteries of Examples 5 to 7, the ion exchange of Li+ on the surface of the cathode active material and H+ in the washing solution may be prevented by applying a buffer such as MOPS during the washing for removing residual lithium after synthesizing a nickel-based lithium transition oxide having a layered structure through primary heat-treating, and as a result, the formation of a NiO-like crystalline phase acting as a resistive element on the surface of the cathode active material is reduced. In contrast, the lithium secondary battery of Comparative Example 4 in which a buffer is not applied exhibits relatively low initial efficiency, low specific capacity, and low life characteristics.

As shown in FIG. 9, it may be found that the lithium secondary battery of Example 7 exhibits resistance reduction characteristics of a high voltage portion of ~3.7V or more when charged, and a low voltage portion of ~3.6V or less when discharged, as compared with the lithium secondary battery of Comparative Example 4.

Further, as given in Table 2, it may be found that as a result of comparing the charge-discharge characteristics of the lithium secondary batteries of Example 7 and Comparative Example 5 in order to compare with the case where general ammonia was applied with the same content as the buffer content when washing the cathode active material, the lithium secondary battery of Example 7 has improved initial efficiency, capacity, and cycle life characteristics as compared with the lithium secondary battery of Comparative Example 5. It may be found through such improved characteristics that in the case where a buffer such as MOPS is applied when washing the cathode active material, the deterioration of protonation on the surface of the cathode active material and the reduction of a NiO-like phase due to the deterioration thereof is effective as compared with the case where general ammonia is applied.

Evaluation Example 7: Evaluation of Content of Residual Lithium when Using Only Buffer In order to confirm the effect of using only a buffer without input of a coating material in the washing process for removing residual lithium after synthesis of lithium transition metal oxide by primary heat treatment during the preparation of the cathode active material, contents of residual lithium were measured in the same manner as in Evaluation Example 5, and the results thereof are given in Tale 3 below.

TABLE 3

| | Washing and coating | | Li$_2$CO$_3$ [wt %] | LiOH [wt %] | Content of residual lithim [ppm] |
|---|---|---|---|---|---|
| | Buffer | Coating | | | |
| Bare | | | 1.385 | 0.811 | 3649 |
| Comparative Example 3 | N/A | N/A | 0.100 | 0.244 | 800 |
| Example 4 | 0.05M MOPS | N/A | 0.115 | 0.297 | 967 |

As given in Table 4, it may be found that in the cathode active material of Example 4 washed with MOPS, the content of residual on the surface of thereof is high, but the residual lithium in bare may be effectively removed, as compared with the cathode active material of Comparative Example 3 washed with water.

Evaluation Example 7: Evaluation of Charge-Discharge Characteristics at Room Temperature when Using Only Buffer In order to confirm the surface deterioration prevention using only a buffer without input of a coating material in the washing process for removing residual lithium after synthesis of lithium transition metal oxide by primary heat treatment during the preparation of the cathode active material, the charge-discharge characteristics of the lithium secondary batteries (half cells) manufactured in Example 8 and Comparative Example 6 were evaluated in the same manner as in Evaluation Example 6.

The results of evaluation of the charge-discharge characteristics of the lithium secondary batteries at room temperature in a voltage range of 4.35 V to 2.8 V are given in Table 4 below, and the results of evaluation of the charge-discharge characteristics thereof in a voltage range of 4.30 V to 2.8 V are given in Table 5 below.

TABLE 4

| | Treatment of cathode active material | | Charge capacity in 1st cycle [mAh/g] | Discharge capacity in 1st cycle [mAh/g] | Initial efficiency [%] | Standard capacity [mAh/g] | Capacity retention rate @27th [%] |
|---|---|---|---|---|---|---|---|
| | Buffer | Coating | | | | | |
| Comparative Example 6 | N/A | N/A | 239 | 208 | 86.9 | 207 | 98.2 |
| Example 8 | 0.05M MOPS | N/A | 240 | 212 | 88.5 | 211 | 98.6 |

TABLE 5

| | Treatment of cathode active material | | Charge capacity in 1st cycle [mAh/g] | Discharge capacity in 1st cycle [mAh/g] | Initial efficiency [%] | Standard capacity [mAh/g] | Capacity retention rate @27th [%] |
|---|---|---|---|---|---|---|---|
| | Buffer | Coating | | | | | |
| Comparative Example 6 | N/A | N/A | 238 | 205 | 86.1 | 202 | 98.6 |
| Example 8 | 0.05M MOPS | N/A | 237 | 207 | 87.0 | 204 | 99.1 |

As given in Tables 4 and 4, it may be found that in the lithium secondary battery manufactured in Example 8, initial efficiency, capacity, and cycle life characteristics at room temperature are improved as compared with the lithium secondary battery prepared in Comparative Example 4. From the results, it may be inferred that in the cathode active material included in the lithium secondary battery of Example 8, initial efficiency, capacity, and cycle life characteristics at room temperature are improved by applying a buffer such as MOPS during the washing for removing residual lithium after synthesizing a nickel-based lithium transition oxide having a layered structure through primary heat-treating, compared to when the washing is performed by pure water.

Evaluation Example 9: Evaluation of Charge-Discharge Characteristics of Full Cell at High Temperature For evaluation of high-temperature charge/discharge characteristics, each of the lithium secondary batteries (full cells) manufactured in Example 11 and Comparative Example 7 was charged with a constant current of 0.2C rate at 25° C. until a voltage reached 4.3 V, and then discharged to a constant current of 0.2C rate until the voltage reached 2.8 V Subsequently, the lithium secondary battery was charged with a constant current of 0.5C rate until a voltage reached 4.3 V, and then charged with a constant voltage until a current reached 0.0.05C rate while maintaining the voltage at 4.3 V. Subsequently, the lithium secondary battery was discharged with a constant current of 0.0.5C rate until the voltage reached 2.8 V during discharging.
(Formation Process)

Each of the full cells having undergone the formation process was charged with a constant current of 1C rate until a voltage reached 4.3 V, and then charged with a constant voltage until a current reached 0.0.05C rate while maintaining the voltage at 4.3 V. Subsequently, the lithium secondary battery was discharged with a constant current of 1C rate until the voltage reached 2.8 V during discharging. This cycle was repeated 500 times, and DCIR evaluation was performed every 0, 100, 300, and 500 cycles.

Figure 11:
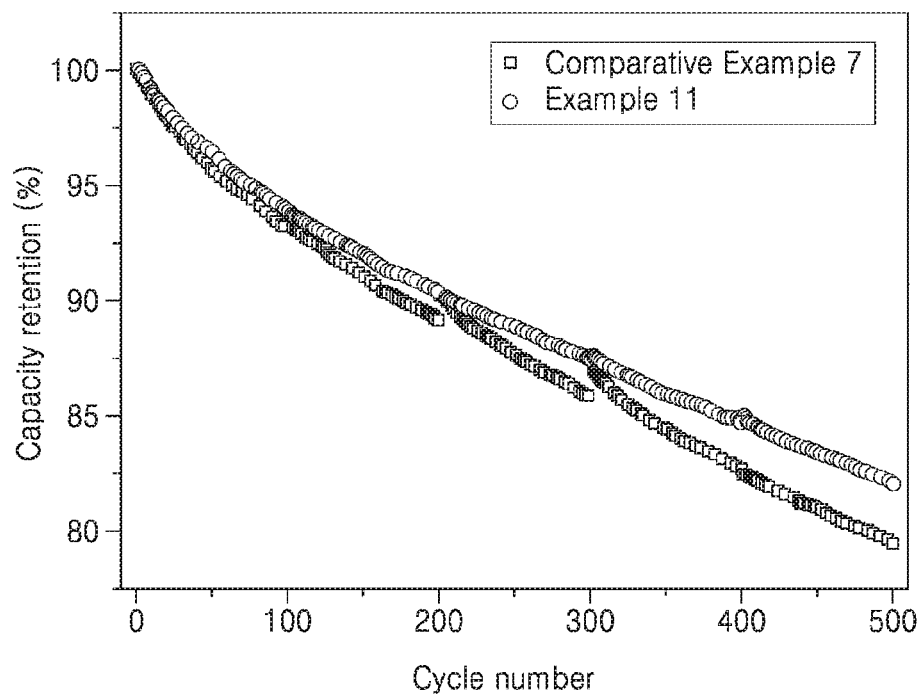
FIG. 11 is a graph illustrating the results of measuring the capacity retention rates for each cycle according to high-temperature charging and discharging of the lithium secondary batteries prepared in Example 11 and Comparative Example 7.

The results of measurement of capacity retention rate (CRR) for each cycle are shown in FIG. 11. The capacity retention rate for each cycle is defined by Capacity retention rate [%]=[discharge capacity for each cycle/discharge capacity in 1st cycle]×100    <Equation 3>

As shown in FIG. 11, it may be found that in the lithium secondary battery of Example 11, high-temperature cycle life characteristics is improved as compared with the lithium secondary battery of Comparative Example 7.

Evaluation Example 7: Evaluation of Direct Current Internal Resistance (DCIR)

Direct current resistance evaluation environments of the lithium secondary batteries (full cells) manufactured in Example 11 and Comparative Example 7 were performed as follows.

Figure 12:
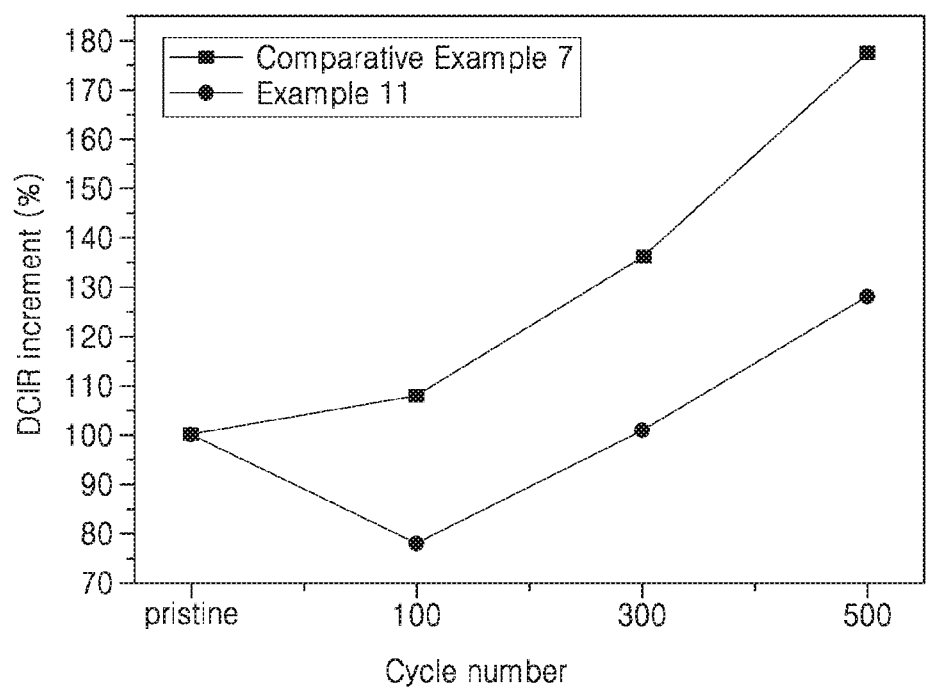
FIG. 12 is a graph illustrating the results of measuring the DCIR increase rates for each cycle of the lithium secondary batteries prepared in Example 11 and Comparative Example 7.

The formation process and 500 cycles of each of the full cells was performed in the same manner as in Evaluation Example 9, and DCIR evaluation was performed every 0, 100, 300, and 500 cycles. DCIR may be measured by an inclination of voltage change to amount of applied current in a method in which each of the full cells was discharged to 0 . . . 2C for 10 second in the state of SOC 50% to replenish the same capacity, discharged to 0 . . . 5C for 10 second to replenish the same capacity, and then discharged to 1C for 10 second to replenish the same capacity. In the measurement of DCIR, as described above, DCIR during discharging may be measured, or DCIR during charging may be measured, but FIG. 12 shows DCIR during discharging. SOC 50% means that the battery is charged to a 50% charge capacity when the total charge capacity is set to 100%.

The DCIR increase rate for each cycle was measured, and the results thereof are shown in FIG. 12.

As shown in FIG. 12, it may be found that in the lithium secondary battery of Example 11, the direct current resistance increase rate according to cycle progress is remarkably reduced as compared with the lithium secondary battery of Comparative Example 7.

Further, each of the lithium secondary batteries manufactured in Example 11 and Comparative Example 7 was stored at 60° C. for 10 days and 30 days, and then the direct current internal resistance (DCIR) increase rate thereof was measured. The results thereof are shown in FIG. 13.

Figure 13:
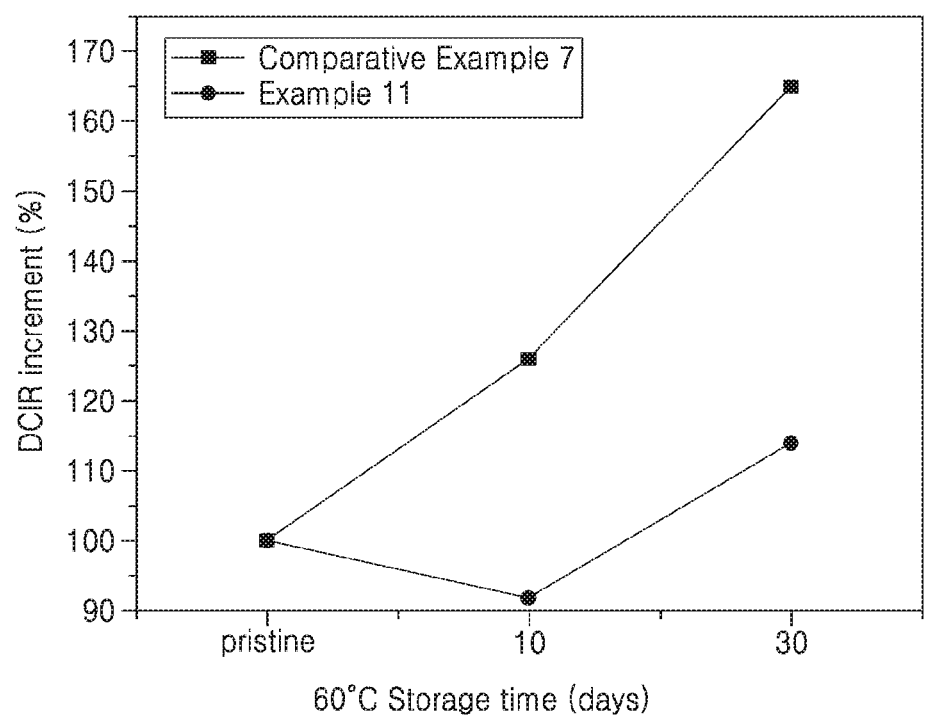
FIG. 13 is a graph illustrating the results of measuring the DCIR increase rates after high-temperature storage of the lithium secondary batteries prepared in Example 11 and Comparative Example 7.

As shown in FIG. 13, it may be found that in the lithium secondary battery of Example 11, the direct current resistance increase rate after high-temperature storage is remarkably reduced as compared with the lithium secondary battery of Comparative Example 7.

Evaluation Example 11: Evaluation of Alternate Current Impedance (ACI)

AC impedance evaluation environments of the lithium secondary batteries (full cells) manufactured in Example 11 and Comparative Example 7 were performed as follows.

The formation process and 500 cycles of each of the full cells was repeated in the same manner as in Evaluation Example 9. The AC impedances of the battery at 100 cycles, 300 cycles, and 500 cycles were measured while scanning from $10^{-1}$ Hz to $10^5$ Hz in the state of SOC 50%. In this case, the amplitude of alternate current was 10 mV.

Figure 14:
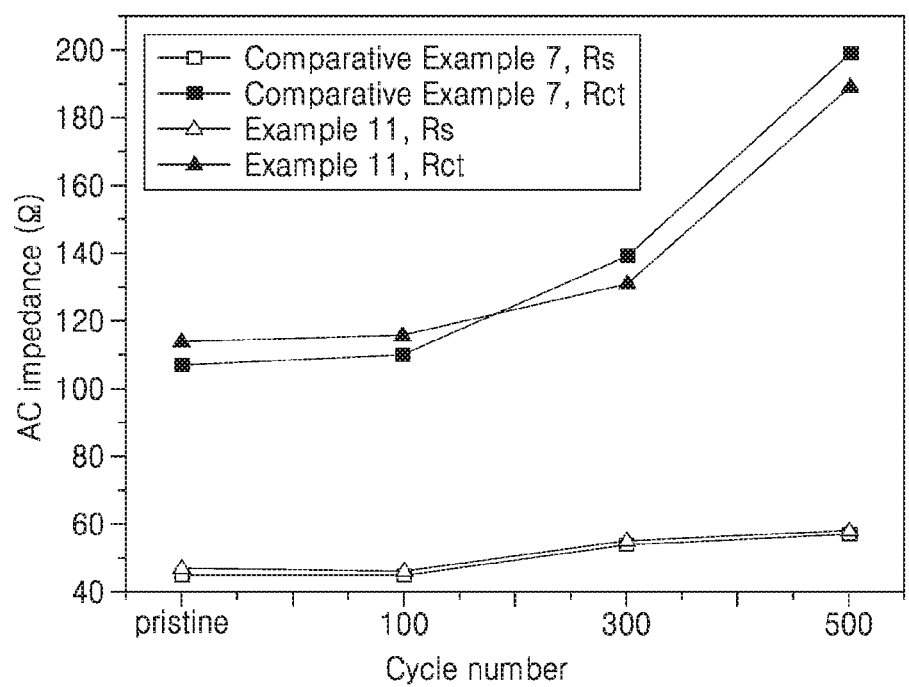
FIG. 14 is a graph illustrating the results of measuring the AC impedances (Rs and $R_{CT}$) for each cycle of the lithium secondary batteries prepared in Example 11 and Comparative Example 7.

The bulk resistance value (Rs) of the cathode obtained from the AC impedance measurement results at each cycle of each of the lithium secondary batteries prepared in Example 11 and Comparative Example 7, and the charge transfer resistance value ($R_{CT}$) at the interface between the cathode and the electrolyte are shown in FIG. 14.

As shown in FIG. 14, it may be found that in the lithium secondary battery of Example 11, the charge transfer resistance value ($R_{CT}$) at the interface between the cathode and the electrolyte is not greatly changed, but the increase rate of the bulk resistance value (Rs) of the cathode is lower, as compared with the lithium secondary battery of Comparative Example 7.

Further, each of the lithium secondary batteries manufactured in Example 11 and Comparative Example 7 was stored at 60° C. for 10 days and 30 days, and then the AC impedance values (Rs and $R_{CT}$) were measured. The results thereof are shown in FIG. 15.

Figure 15:
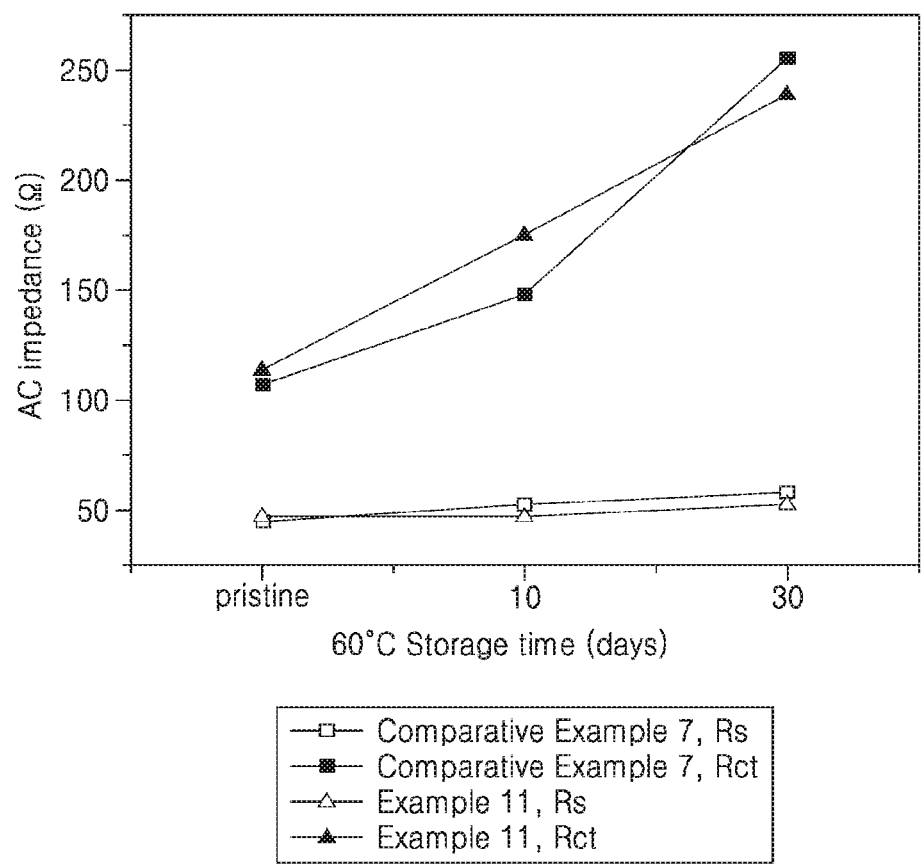
FIG. 15 is a graph illustrating the results of measuring the AC impedances (Rs and $R_{CT}$) after high-temperature storage of the lithium secondary batteries prepared in Example 11 and Comparative Example 7.

As shown in FIG. 15, it may be found that in the lithium secondary battery of Example 11, not only the increase rate of the bulk resistance value (Rs) of the cathode after high-temperature storage is lower, but also the charge transfer resistance value ($R_{CT}$) at the interface is lower as compared with the lithium secondary battery of Comparative Example 7.

In the cathode active material according to embodiments and the preparation method thereof, surface deterioration may be prevent through a washing process using a weakly acidic or neutral organic buffer, thereby improving the initial efficiency, capacity and life characteristics of the lithium secondary battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A cathode active material for a lithium secondary battery, the cathode active material comprising:
    a secondary particle comprising a plurality of primary particles; and
    a first coating layer disposed on the primary particles to have a thickness of 2.5 nm or less, the first coating layer comprising a NiO-like crystalline phase belonging to a Fm3-m space group.

2. The cathode active material of claim 1, wherein the primary particles comprise a nickel-based lithium transition metal oxide in which a content of nickel in a transition metal is about 70 mol % or more.

3. The cathode active material of claim 1, wherein the primary particles comprise a lithium transition metal oxide represented by Formula 1 below:

  [Formula 1]

wherein,
M1 is at least one element selected from Co, Mn, and Al,
M2 is at least one element selected from B, Mg, Ti, Ca, Na, K, Sr, Cr, V, Fe, Cu, Zr, Zn, Si, Y, Nb, Ga, Sn, Mo, W, Ba, and rare-earth elements, and
0.9≤a≤1.1, 0.7≤b<1.0, 0<c≤0.3, 0≤d≤0.1, and 0.95≤b+c+d≤1.05 are satisfied.

4. The cathode active material of claim 1, wherein the primary particles comprise a lithium transition metal oxide represented by Formula 2 below:

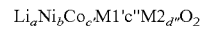  [Formula 2]

wherein,
M1' is at least one element selected from Mn and Al,
M2 is at least one element selected from B, Mg, Ti, Ca, Na, K, Sr, Cr, V, Fe, Cu, Zr, Zn, Si, Y, Nb, Ga, Sn, Mo, W, Ba, and rare-earth elements, and
0.9≤a≤1.1, 0.7≤b<1.0, 0<c'≤0.3, 0<c"≤0.3, 0<c'+c"≤0.3, 0≤d'≤0.1, and b+c'+c"+d'=1 are satisfied.

5. The cathode active material of claim 2, wherein the nickel-based lithium transition metal oxide comprises a layered crystalline phase belonging to a R-3m space group.

6. The cathode active material of claim 1, wherein:
    the primary particles have an average particle diameter of about 50 nm to about 2 μm, and
    wherein the secondary particle, comprising the primary particles, has an average particle diameter of about 1 μm to 50 μm.

7. The cathode active material of claim 1, wherein the secondary particle further comprises a second coating layer on a portion of a surface of the secondary particle, the second coating layer containing a metal compound of cobalt (Co) and at least one selected from Group 2 elements, Group 12 elements, and Group 13 elements.

8. The cathode active material of claim 7, wherein the metal compound comprises a metal alloy, a metal oxide, a metal sulfide, a metal chloride, a metal nitride, a metal fluoride, a metal phosphide, a metal alkoxide, or a combination thereof.

9. The cathode active material of claim 7, wherein the content of the metal oxide is about 0 parts by weight to about 5 parts by weight based on 100 parts by weight of the lithium metal oxide included in the second particle.

10. The cathode active material of claim 7, wherein the second coating layer is uniformly formed on the surface of the secondary particle to have a thickness of about 1 μm or less.

11. A cathode comprising the cathode active material of claim 1.

12. A lithium secondary battery comprising the cathode of claim 11.

13. A method of preparing the cathode active material of claim 1, the method comprising:
   primarily heat-treating a mixture comprising a transition metal precursor and a lithium source;
   washing the primarily heat-treated mixture using a solvent comprising a weakly acidic or neutral organic buffer to obtain a washed mixture; and
   secondarily heat-treating the washed mixture.

14. The method of claim 13, wherein the organic buffer comprises an amphiphilic organic compound having a sulfone group.

15. The method of claim 14, wherein the amphiphilic organic compound having a sulfone group comprises at least one selected from the group consisting of MOPS (3-(N-morpholino)propanesulfonic acid), MES (2-( N-morpholino)ethanesulfonic acid), HEPES (2-[4-(2-hydroxyethyl)piperazin-1-yl] ethanesulphonic acid), PIPES (1,4-piperazindieethanesulfonic acid), TES ( N-tris (hydroxymethyl)methyl-2-aminoethanesulfonic acid), ACES ( 2-(carbamoylmethylamino)ethanesulfonic acid), BES (N,N-bis(2-hydroxyl -2-amino)ethanesulfonic acid), and CHES ((cyclohexylamino)ethanesulfonic acid).

16. The method of claim 13, wherein the organic buffer is comprised in the solvent in a concentration of about 0.001 M to about 2 M.

17. The method of claim 13, wherein the organic buffer is added to the solvent one or more times during the washing.

18. The method of claim 13, wherein, in the washing of the resulting product, a coating material for surface-coating the cathode active material is further introduced into the solvent.

19. The method of claim 13, wherein the mixture is prepared by a dry mixing method.

20. The method of claim 13, wherein at least one of the primary heat treatment and the secondary heat treatment is performed at about 600° C. to about 1000°C. under an air or oxygen atmosphere.

* * * * *

UNITED STATES PATENT AND TRADEMARK OFFICE
CERTIFICATE OF CORRECTION

| | | |
|---|---|---|
| PATENT NO. | : 12,132,202 B2 | Page 1 of 1 |
| APPLICATION NO. | : 17/081125 | |
| DATED | : October 29, 2024 | |
| INVENTOR(S) | : Dongwook Shin | |

It is certified that error appears in the above-identified patent and that said Letters Patent is hereby corrected as shown below:

In the Specification

In Column 2, Line 14, delete "and Al," and insert --and Al.--.

In Column 11, Line 22, delete "one embodiment" and insert --one embodiment.--.

In Column 11, Line 39, delete "of Lion the" and insert --of $Li^+$ on the--.

In Column 15, Line 64, delete "gamma-butylolactone," and insert --gamma-butyrolactone,--.

In Column 16, Line 5, delete "methyl pyropionate," and insert --methyl propionate,--.

In Column 24, Line 51, (TABLE 3), delete "residual lithim" and insert --residual lithium--.

In the Claims

In Column 28, Claim 4, Line 51, delete "$Li_aNi_bCo_{c'}M1'_{c''}M2_{d''}O_2$" and insert
--$Li_aNi_bCo_{c'}M1'_{c''}M2_{d'}O_2$--.

In Column 30, Claim 15, Lines 7-8, delete "MES (2-( N-morpholino)ethanesulfonic acid)," and insert
--MES (2-(N-morpholino)ethanesulfonic acid),--.

In Column 30, Claim 15, Lines 10-11, delete "TES ( N-tris(hydroxymethyl)methyl-2-
aminoethanesulfonic acid)," and insert --TES (N-tris(hydroxymethyl)methyl-2-aminoethanesulfonic
acid),--.

Signed and Sealed this
Twenty-fifth Day of February, 2025

Coke Morgan Stewart
*Acting Director of the United States Patent and Trademark Office*